(12) United States Patent
Ditillo

(10) Patent No.: US 11,473,379 B2
(45) Date of Patent: Oct. 18, 2022

(54) DRILLING MACHINE PROVIDED WITH A DETECTION SYSTEM FOR DETECTING AT LEAST ONE LOCKING POSITION OF A ROTARY HEAD OF AN EXTENSION ELEMENT OF A DRILL STRING AND METHOD FOR DETECTING SAID AT LEAST ONE LOCKING POSITION

(71) Applicant: SOILMEC S.P.A., Cesena (IT)

(72) Inventor: Alessandro Ditillo, Cesena (IT)

(73) Assignee: SOILMEC S.P.A., Cesena (IT)

( * ) Notice: Subject to any disclaimer, the term of this patent is extended or adjusted under 35 U.S.C. 154(b) by 0 days.

(21) Appl. No.: 17/057,126

(22) PCT Filed: Jun. 26, 2019

(86) PCT No.: PCT/IB2019/055379
§ 371 (c)(1),
(2) Date: Nov. 20, 2020

(87) PCT Pub. No.: WO2020/003145
PCT Pub. Date: Jan. 2, 2020

(65) Prior Publication Data
US 2021/0189809 A1   Jun. 24, 2021

(30) Foreign Application Priority Data

Jun. 28, 2018   (IT) ..................... 102018000006771

(51) Int. Cl.
*E21B 19/16*   (2006.01)
*E21B 3/02*   (2006.01)
(Continued)

(52) U.S. Cl.
CPC ............... *E21B 19/16* (2013.01); *E21B 3/02* (2013.01); *E21B 7/02* (2013.01); *E21B 17/00* (2013.01); *E21B 19/24* (2013.01); *G01D 5/04* (2013.01)

(58) Field of Classification Search
CPC ... E21B 19/16; E21B 3/02; E21B 7/02; E21B 17/00; E21B 19/24; E21B 17/07; E21B 7/023; G01D 5/04
See application file for complete search history.

(56) References Cited

U.S. PATENT DOCUMENTS 8,757,935 B2 *   6/2014   Ditillo ..................... E02D 3/12
405/263
8,910,719 B2 *   12/2014   Kockeis ................. E21B 19/15
166/380

(Continued)

FOREIGN PATENT DOCUMENTS

EP            2662523 A1   11/2013
WO   WO-2011012967 A1   2/2011

OTHER PUBLICATIONS

International Search Report dated Sep. 27, 2019 in PCT/IB2019/055379, 3 pages.

(Continued)

*Primary Examiner* — Giovanna Wright
*Assistant Examiner* — Jonathan Malikasim
(74) *Attorney, Agent, or Firm* — Element IP, PLC

(57) ABSTRACT

A single-pass type drilling machine includes a guide tower, a string of drilling rods, an extension element having an upper end and a lower end with the lower end being coupled with an upper end of the string of drilling rods, a rotary head slidably coupled with the guide tower, and a detection system. The rotary head and the extension element are mutually slidable and arranged to couple with each other in an upper end stop position, where the rotary head is coupled
(Continued)

with the extension element substantially at the upper end of the extension element. The rotary head is coupled with the extension element at a lower position with respect to the upper end stop position in at least one locking position. The detection system detects the reaching of the at least one locking position by detecting at least the mutual axial position of the extension element and the rotary head.

16 Claims, 16 Drawing Sheets

(51) Int. Cl.
| | |
|---|---|
| *E21B 7/02* | (2006.01) |
| *E21B 17/00* | (2006.01) |
| *E21B 19/24* | (2006.01) |
| *G01D 5/04* | (2006.01) |

(56) References Cited

U.S. PATENT DOCUMENTS

| | | | |
|---|---|---|---|
| 9,115,545 B2* | 8/2015 | Biserna | E21B 7/023 |
| 9,157,209 B2* | 10/2015 | Biserna | E21B 17/12 |
| 10,309,166 B2* | 6/2019 | Thiemann | E21B 33/05 |
| 2005/0169717 A1* | 8/2005 | Field | E21B 47/04 |
| | | | 408/13 |
| 2012/0186882 A1 | 7/2012 | Biserna | |
| 2013/0294843 A1 | 11/2013 | Biserna | |

OTHER PUBLICATIONS

Written Opinion dated Sep. 27, 2019 in PCT/IB2019/055379, 6 pages.

* cited by examiner

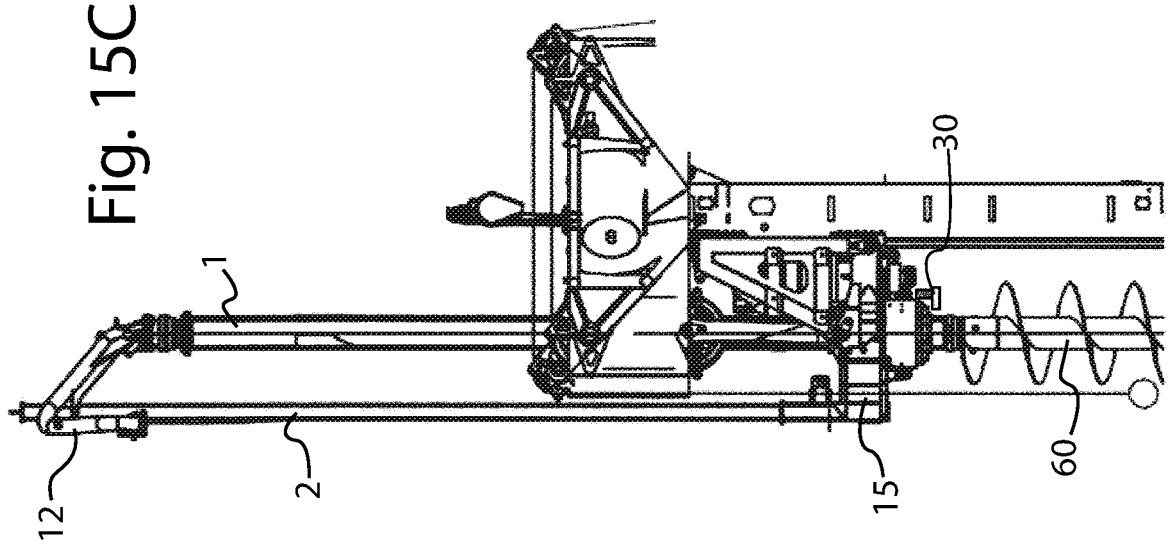
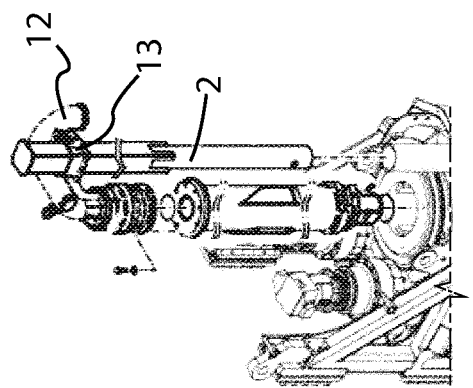
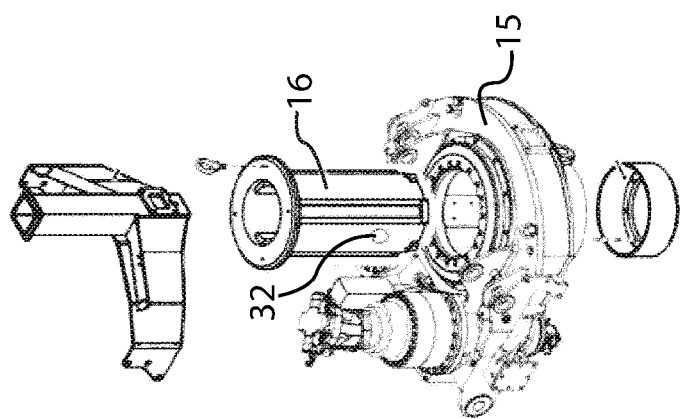

DRILLING MACHINE PROVIDED WITH A DETECTION SYSTEM FOR DETECTING AT LEAST ONE LOCKING POSITION OF A ROTARY HEAD OF AN EXTENSION ELEMENT OF A DRILL STRING AND METHOD FOR DETECTING SAID AT LEAST ONE LOCKING POSITION

The present invention relates to an excavating machine provided with a detection system to detect the reaching of at least one locking position of a rotary head on an extension element of a drill string and to a method for detecting said at least one locking position.

Within the context of foundation engineering, two drilling methodologies have become consolidated over time for the realization of foundation piles, i.e. the methodology commonly known as "multi-pass" and that commonly known as "single-pass" to which two respective types of drilling machines correspond.

Drilling machines for realizing piles generally comprise a self-propelled unit, e.g. provided with belts, with a rotating turret comprising a cab for the operator, a power unit and all the control circuits. These machines further comprise a guide tower that is connected to the rotating turret so as to be constrained at least in rotation to pass from a configuration proximal to the horizontal (transport or assembly configuration) to one proximal to the vertical (work configuration). A rotating or rotary head is mounted slidably on the guide tower.

According to the drilling methodology commonly known as "multi-pass", the "multi-pass" type drilling machine, illustrated by way of example in FIG. 1, comprises a telescopic drill rod, commonly known as a Kelly rod, which comprises 2 or more concentric and coaxial elements; the Kelly rod crosses the rotary head and carries at an end thereof an excavation tool (bucket, auger, . . . ). The rotary head imparts to the Kelly rod all the necessary pull, thrust and torque forces. Generally, the piles realized through this drilling technique are called bored piles.

The "multi-pass" drilling machine is therefore characterized by discontinuous drilling that requires the excavation tool to exit from the hole at each drilling cycle, to remove the excavated material.

At each cycle the Kelly rod is lowered into the hole, the excavation tool excavates a portion of pile gradually becoming filled with excavated soil; the filling of the excavation tool is followed by a step of rising from the hole to unload the excavated soil. Once the unloading step is finished, a new excavation cycle starts and so on until the predefined depth is reached. Piles of this type can have a depth from tens of metres to over 100 m and to reach them, Kelly rods with 3, 4, 5 or 6 extensions must be used.

Otherwise, according to the drilling methodology for realizing foundation piles known as "single-pass", the "single-pass" drilling machine comprises a string of non-telescopic rods, therefore the maximum depth that can be reached is directly connected with the length of the stroke that the rotary head can perform sliding on the guide tower.

The rod can be smooth or have a helix conformation and can have radial blades located on the tip and sometimes dislocated also along the entire string. The "single-pass" drilling methodology provides reaching the depth without having to cyclically evacuate the excavated soil that can instead substantially be treated in various ways. In particular, the excavated soil can be lifted continuously, as typically happens in continuous auger drilling with CFA (Continuous Flight Auger) machines such as the one illustrated in FIG. 2, or in cased continuous auger drilling, with CSP (Cased Secant Piles) machines or CAP (Cased Augered Piles) machines such as the one illustrated in FIG. 5. Alternatively, the excavated soil can be displaced and compacted in the hole with compacting pile or displacement or TCT machines, such as the one illustrated in FIG. 3. According to a further alternative, an excavation is not performed but an in-situ consolidation, therefore mixing (soilmixing, jet grouting, turbojet, cutter soil mix consolidations) with machines such as the one illustrated in FIG. 4.

Therefore, according to the "single-pass" drilling methodology, during the penetration step of the excavation tool in the soil (which can be directed to the maximum height or can also take place with various passes on the same area) the excavation tool breaks up, cuts the material, and once the final height is reached the string of drilling rods is extracted from the hole. During the extraction and/or penetration steps, injections of pressurized liquids can be performed including, for example, cementitious mixes, grout, water, air.

These techniques allow depths of a few tens of metres to be reached. In order to be able to reach greater depths an extension element or extension tube 1 is normally used with a length that varies from a few metres to 6-10 m if projecting, or that can even reach the order of 20 m if guided such as, for example, in the machine of FIG. 6 where the extension tube is guided by a lattice.

The extension element 1 is normally realized with a tube that has an internal passage of 3"-5", therefore not a very large section with respect to the maximum outer diameter of the excavation tool; such extension element 1 is provided with outer strips 16 adapted to be engaged with the rotary head 15. In detail, the extension element 1 is mounted so as to be able to slide through the rotary head 15 that has a rotating cylindrical sleeve 17 provided with engagement strips that are engaged on the outer strips 16 of the extension element 1 to impart the movement torque.

The outer strips 16 of the extension element 1 define one or more locking seats, for example bayonet, which identify respective locking positions.

The extension element 1 is also provided with a joint 19 to be connected to the upper end of the string of drilling rods 60, so as to become integral with the string 60 and transmit the thrust and torque to said string 60.

The drilling step starts with the machine arranged as in the operating conditions shown by FIGS. 2, 3, 4 and 5 in which the extension element 1 completely projects above the rotary head 15 and the rotary head 15 is engaged with the extension element 1 in the lower locking position, i.e. the locking position that is closest to the lower end of the extension element 1.

In such locking position the rotary head 15 can impart torque both in the clockwise and anticlockwise direction. The rotary head 15 can furthermore lift the string of drilling rods 60 through an upwards sliding movement of the rotary head 15 itself on the guide tower.

Generally, the locking seats are of the bayonet type and each of them has an upper abutment portion 50, substantially orthogonal to the longitudinal extension of the extension element 1, a first side abutment portion 51 and a second side abutment portion 52 opposite the first. The side portions 51, 52, in particular, extend longitudinally so that the longitudinal extension of the second side portion 52 is shorter than the longitudinal extension of the first side portion 51.

To lift the string of rods it is necessary for the rotary head 15 to be engaged with the extension element in one of the locking positions; at this point by lifting the rotary head 15 the engagement strips 18 enter into mechanical abutment with the upper abutment portion 50 of the seat realized by the outer strips 16 of the extension element 1. Such upper abutment portion can for example extend for a stretch in the circumferential direction on the outer surface of the extension element 1. Once the engagement strips 18 are in abutment on the upper abutment portion 50 of the locking seat, the extension element 1 and the rotary head 15 behave like integral bodies, therefore an upwards movement of the rotary head 15 implies the lifting of the extension element 1 and of the whole string of drilling rods 60 connected thereto. In the same way, when the engagement strips 18 of the rotary head 15, in particular of the cylindrical sleeve 17 of the rotary head 15, are inserted into the bayonet locking seat of the extension element 1, the rotary head 15 can apply a downwards thrust to the extension element 1 and to the whole connected string of drilling rods 60. In that case the engagement strips 18 of the cylindrical sleeve 17 of the rotary head 15 go into mechanical abutment with a lower axial abutment element. Such lower axial abutment element may be an annular upper portion of the string of rods. Alternatively, it is possible that in the rotary head a diameter reducer 10 is mounted, provided externally with strips adapted to engage with the inner strips of the cylindrical sleeve 17 and internally with engagement strips intended to engage with the outer strips 16 of the extension element 1.

The expression engagement strips of the rotary head 15 is intended herein to indicate the engagement strips 18 of the cylindrical sleeve 17 or the engagement strips of the diameter reducer 10 should the latter be mounted and engaged in the cylindrical sleeve 17.

The diameter reducer 10 may comprise a lower axial mechanical abutment 14 of the removable type for receiving the thrust of the rotary head. The lower axial mechanical abutment element 14 may for example comprise a collar 14 that can be dismantled into two half-collars, as shown in FIG. 7. The diameter reducer 10, without the collar, is inserted into the cylindrical sleeve 17 of the rotary head 15, projecting axially below the rotary head 15. Once the diameter reducer 10 is completely inserted, the collar 14 can be applied thereto, which is located below the rotary head 15. Once assembled, the collar 14 is integral with the diameter reducer 10 and therefore the diameter reducer can receive the downwards axial thrust from the rotary head 15 and transmit it through its own strips to the extension element 1.

Once the rotary head 15 has finished the entire downwards stroke and the string of drilling rods 60 has reached the maximum depth allowed, the engagement strips 18 of the rotary head 15 are disengaged from the locking seat. The disengagement is performed by lowering the rotary head 15 until the engagement strips 18 are brought into a position in which, by making a partial anticlockwise rotation, i.e. in the opposite direction to the excavation directions, the engagement strips 18 of the cylindrical sleeve 17 of the rotary head 15 or those of the diameter reducer 10 are taken out from the bayonet locking seat. The rotary head 15 is then lifted, making it slide on the guide tower, whereas the string of rods 60 and the extension element remain axially stationary, until the rotary rods reach a new locking position. Such locking position may be at the upper end of the extension element 1 or, if the extension element is very long and has two or more engagement seats, at any intermediate position with respect to the longitudinal extension of the extension element 1.

Once the new locking position has been reached, a clockwise rotation is imparted to the rotary head 15 so that the engagement strips 18 of the rotary head 15 are inserted into the respective locking seat of the extension element 1 and drilling proceeds for the new available stroke, fixing the extension element 1 partially or totally into the ground.

With reference to FIGS. 8A-8E the locking positions of the engagement strips 18 of the rotary head 15 within the respective locking seats of the extension element 1 will be explained in more detail below.

In FIGS. 8A-8E the rotary head is not shown in order to allow the mutual position of the strips and the locking seats to be displayed more clearly.

Reference will be made to the case in which the rotary head 15 does not have the diameter reducer 10. The considerations made in relation to the cylindrical sleeve 17 can, therefore, be applied to the diameter reducer 10.

FIG. 8A shows the cylindrical sleeve 17 of the rotary head 15 when it is engaged with the extension element 1 in the lower locking position. In this condition the rotary head 15 can transmit to the extension element 1 either torque in the clockwise or anticlockwise direction, or extraction pull, or a fixing thrust. In particular, in the configuration of FIG. 8a, the cylindrical sleeve 15 has an engagement strip 18 inserted in the locking seat corresponding to the lower locking position.

FIG. 8B shows the start of the step of disengaging the engagement strips 18 of the rotary head 15 of the locking seat of the extension element 1. The rotary head 15 is lowered by sliding with respect to the extension element 1, e.g. while the string of rods 60 rests on the ground or is axially retained with vices or clamps so as to remain axially stationary even if it is no longer axially engaged with the rotary head 15. Then, the rotary head 15 is rotated according to the direction indicated by the arrow, i.e. the opposite direction to the excavation direction, to bring the engagement strip 18 of the cylindrical sleeve 17 of the rotary head 15 into a configuration in which it is free to slide longitudinally with respect to the extension element 1, i.e. in the configuration illustrated in FIG. 8D.

In fact, FIG. 8D shows the operating condition in which the rotary head 15 can be lifted through axially sliding with respect to the extension element 1 to reach another locking position at a higher height with respect to the original one. In this condition, the rotary head 15 can slide in relation to the extension element 1 reaching the condition of FIG. 8E as the abutment strip 18 of the rotary head 15 is outside the locking seat and inside a longitudinal channel without projections or recesses that could prevent the mutual movement along the extension element 1. Such sliding can continue until an upper end stop position is reached in which the rotary head 15 is coupled with the upper end of the extension element 1 for transmitting thereto at least one pulling force and a rotation movement. This upper end stop position can be identified, for example, by an upper abutment portion of the upper end of the extension element 1. This abutment portion is intended to provide a mechanical stop for the rotary head 15, e.g. for the cylindrical sleeve 17.

FIG. 8C shows an undesired condition in which the rotary head 15 has the engagement strip 18 not correctly fitted into the locking seat. Such condition can be reached if, starting from the condition of FIG. 8B, a rotation of an insufficient magnitude to completely disengage the engagement strip 18 of the rotary head 15 from the locking seat is performed, or if starting from the condition of FIG. 8D a rotation of insufficient magnitude to completely engage the engagement strip 18 of the rotary head 15 from the locking seat is performed. In this particular condition the engagement strip 18 of the rotary head 15 is exactly below the second longitudinal portion 52 of the locking seat. The extension element 1 is thus supported by the rotary head as the second longitudinal portion 52 of the locking seat rests on the engagement strip 18 of the rotary head 15. If the rotary head 15 is lifted, the extension element 1 and the whole string translate integrally therewith. Furthermore, in such condition, if the rotary head 15 performs a clockwise or anticlockwise rotation, due to the effect of the friction present between the second longitudinal portion 52 of the locking seat and the engagement strip 18, such rotation is however transmitted to the rods, but the coupling is uncertain and therefore such condition is dangerous.

In fact, in the condition of FIG. 8C, if the operator performs sufficiently slow manoeuvres, the rotary head and the string of rods behave integrally, the operator has the perception that they are correctly engaged in each other. In the event of fast manoeuvres or external disturbances that constrain the friction between the engagement strip 18 of the rotary head 15 and the second longitudinal portion 52 of the locking seat, there may be misalignment between them which can bring the engagement strip into the condition of FIG. 8D thus causing unexpected and uncontrolled axial sliding of the extension element with respect to the rotary head.

This can be dangerous especially in the machine installation steps when the string of excavation rods is mounted. To reduce the dimensions and weight during transport the strings of rods are often realized through modular segments, which are transported separately and then joined together on site in the necessary number to form the desired length of the string. To compose the string a first segment is connected to the extension element 1, then it is lifted by translating the rotary head 15 and leaving a sufficient space with respect to the ground, e.g. a few metres, to be positioned below the new segment to be jointed. The operation is then repeated until the string has a comparable length to that of the tower. For the disassembly of the string into individual segments, the sequence is substantially inverted.

If during the assembly of the string of rods, the rotary head 15 is in an uncertain coupling there may be a "free fall" axial sliding of the extension element 1 and of the segments of string with respect to the rotary head if due to vibrations, movements and impacts, these two parts rotate in relation to each other and the extension element 1 ends up in the free axial sliding configuration of FIG. 8D. Such a "free fall" would be very dangerous because at the end of the sliding stroke, the upper end of the extension element would impact violently against the rotary head 15 causing mechanical damage. Furthermore, the impact generated would have strong dynamic effects, generating an overturning force that would compromise the stability of the machine. Furthermore, if there were any objects or people in the vicinity of the string during the installation step, they could be hit by the sudden descent of the string.

This dangerous event is less likely to happen during the work steps, as the installed rod generally occupies the entire available length of the tower, therefore also when the rotary head is in the highest position of the tower there is not much space between the lower end of the rod and the ground, thus the consequent effects are less serious but there could still be damage to the machine.

It is therefore necessary for the operator who manoeuvres the digging machine to have the possibility to safely verify whether the rotary head 15 is perfectly engaged with the extension element 1 or if it is uncertainly coupled like that of FIG. 8C.

The object of the present invention is that of providing a "single-pass" type drilling machine that enables errors to be prevented in the engagement procedures between the rotary head and the extension element in at least one locking position.

This and other objects according to the present invention are achieved by realizing a drilling machine and method for detecting at least one locking position as recited in claims 1 and 17.

Further characteristics of the drilling machine and the method for detecting at least one locking position are the subject matter of the dependent claims.

The features and advantages of a drilling machine and method for detecting said at least one locking position according to the present invention will be more apparent from the following description, which is to be understood as exemplifying and not limiting, with reference to the schematic attached drawings, wherein:

FIGS. 15A, 15B and 15C are three detailed schematic views of a detail of a further alternative embodiment of the drilling machine according to the present invention;

Figure 1:
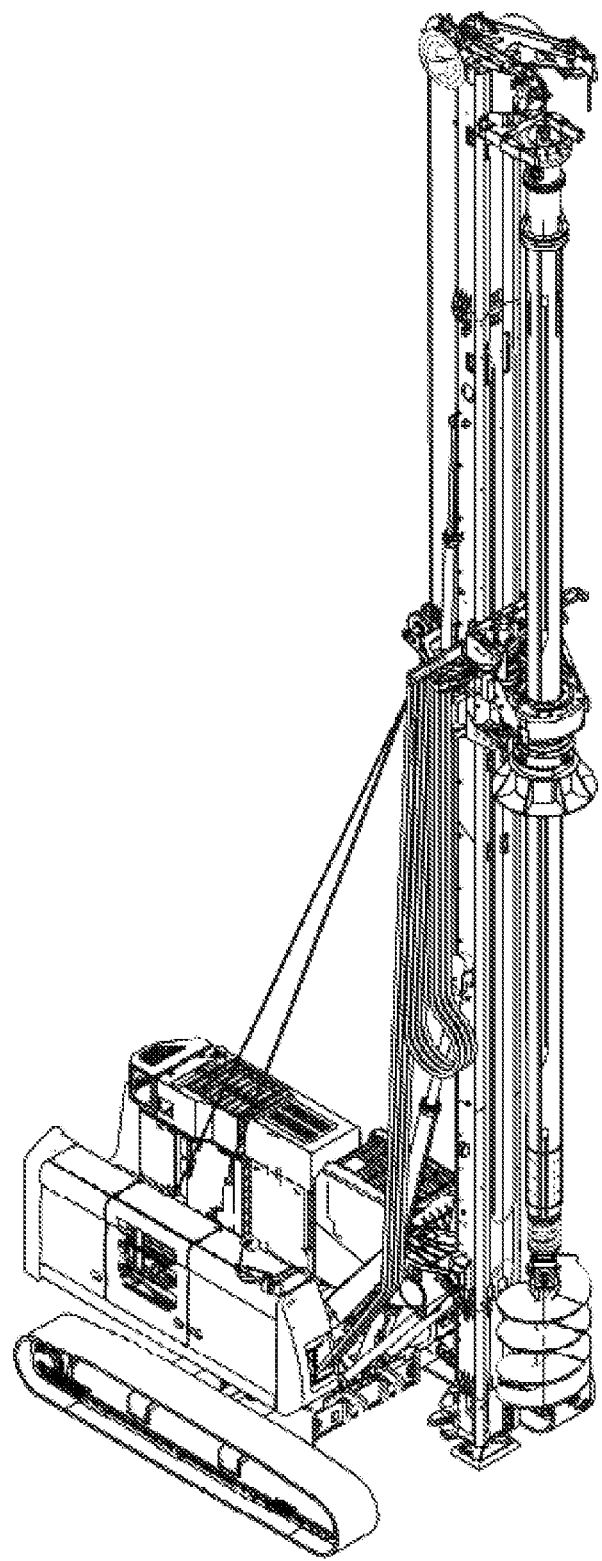
FIG. 1 is a perspective schematic view of a drilling machine of the multi-pass type according to the prior art.
Figure 2:
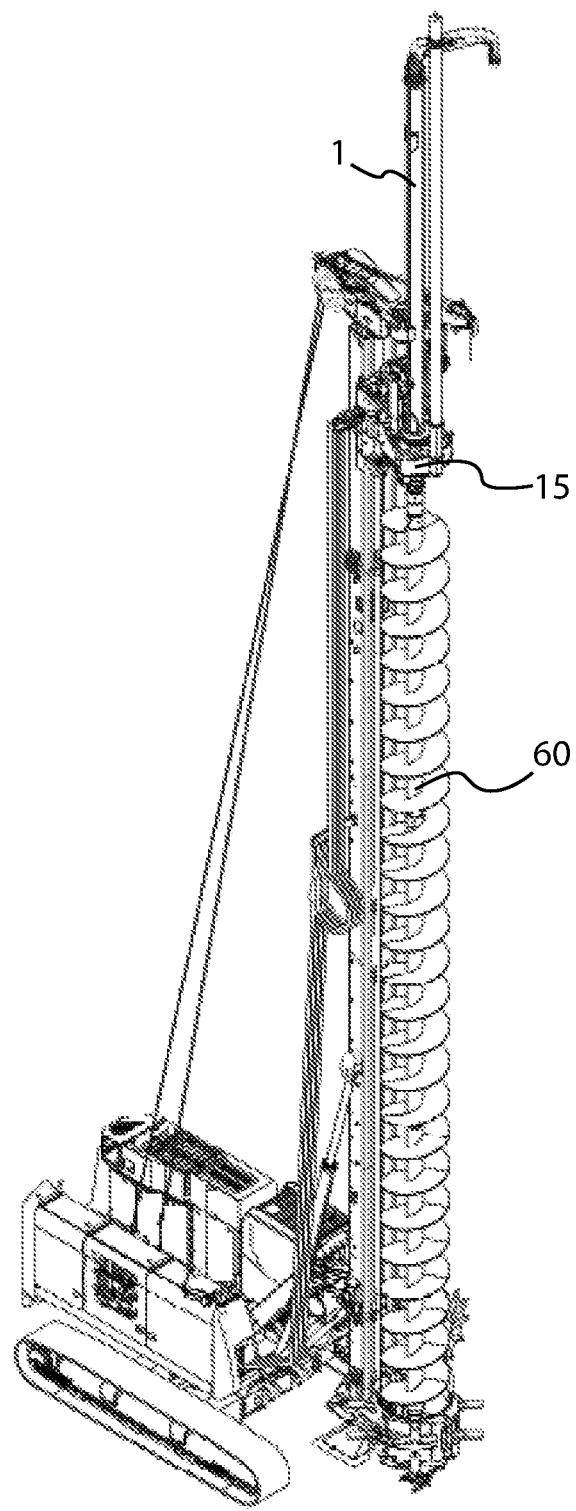
FIG. 2 is a side schematic view of a drilling machine of the single-pass type suitable for CFA drilling technology according to the prior art.
Figure 3:
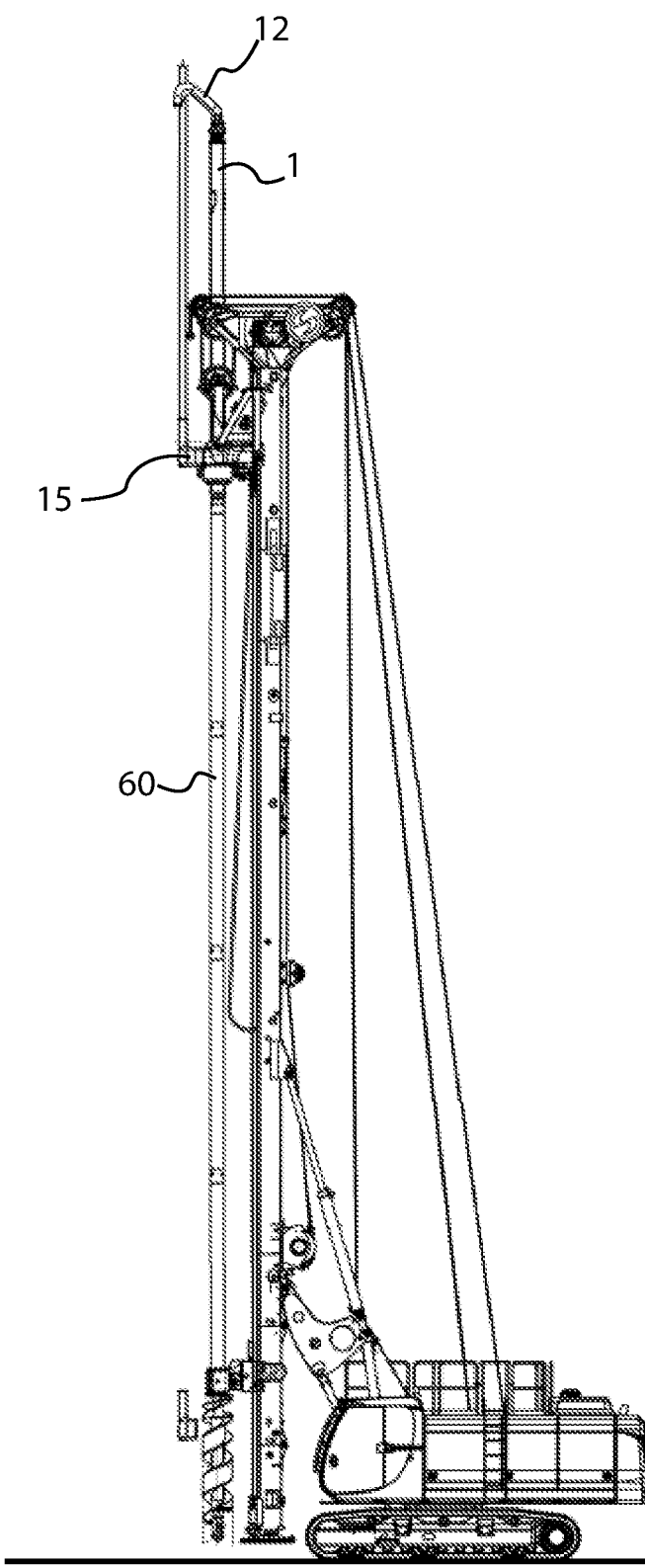
FIG. 3 is a side schematic view of a drilling machine of the single-pass type suitable for realizing compacting piles according to the prior art.
Figure 4:
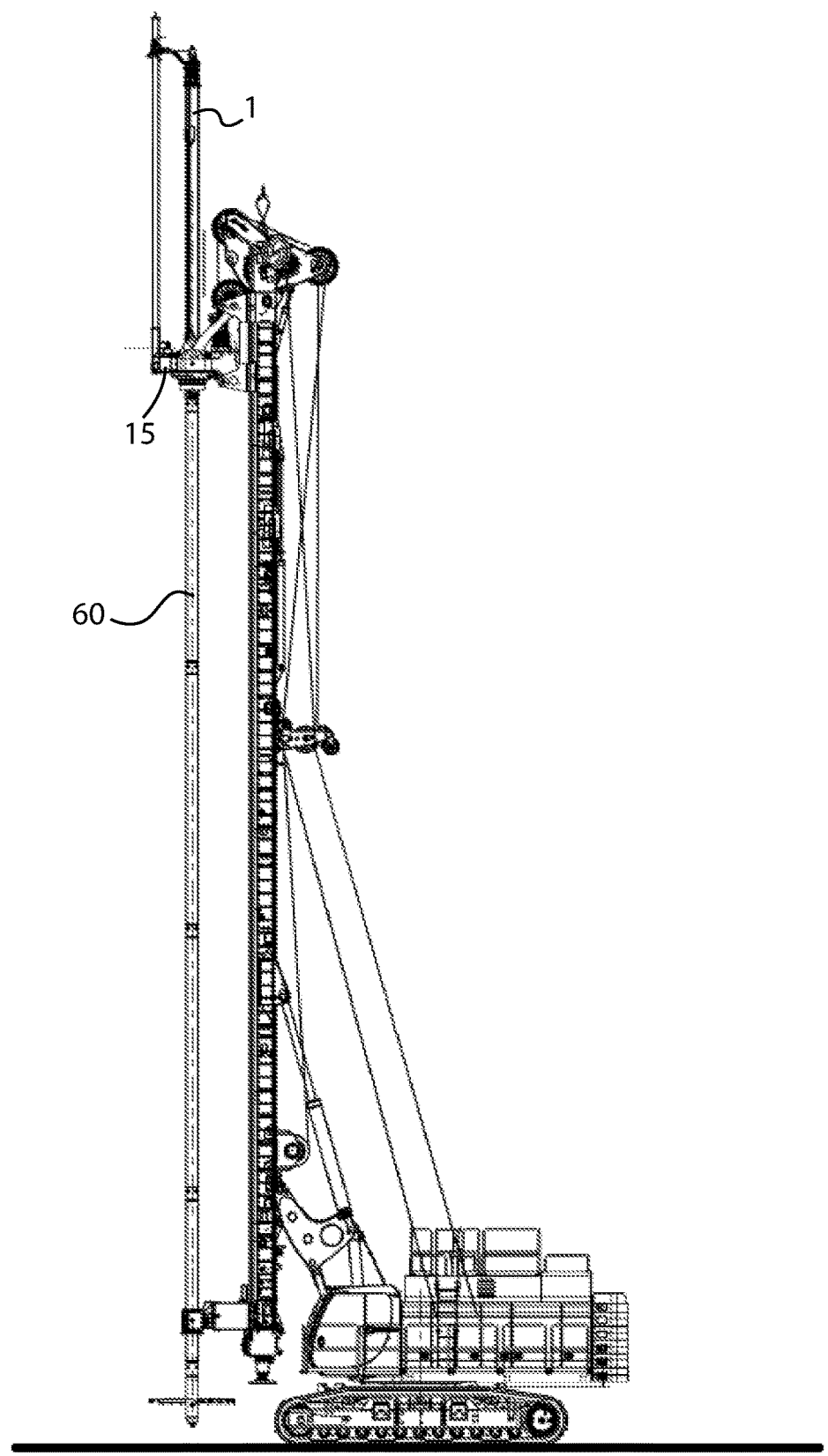
FIG. 4 is a side schematic view of a drilling machine of the single-pass type suitable for in-situ consolidation according to the prior art.
Figure 5:
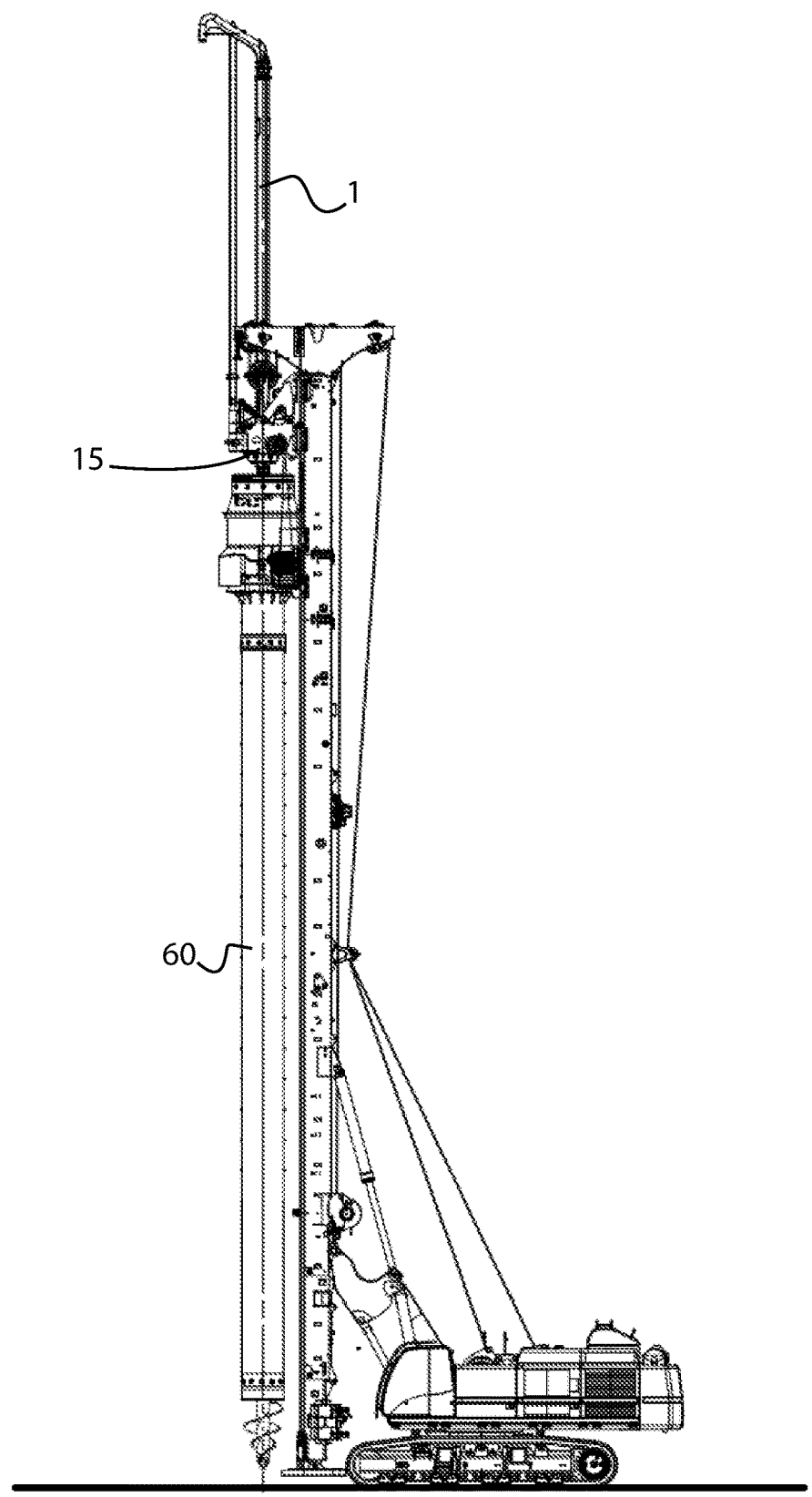
FIG. 5 is a side schematic view of a drilling machine of the single-pass type suitable for CSP drilling technology according to the prior art.
Figure 6:
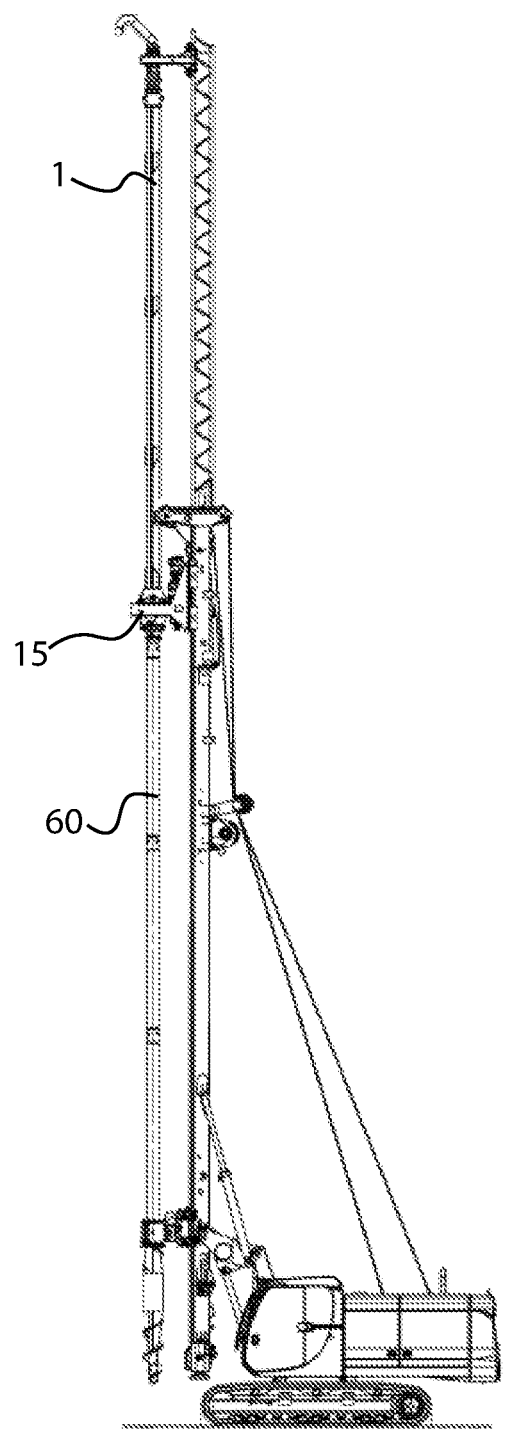
FIG. 6 is a side schematic view of a drilling machine of the single-pass type suitable for realizing compacting piles at great depths according to the prior art.
Figure 7:
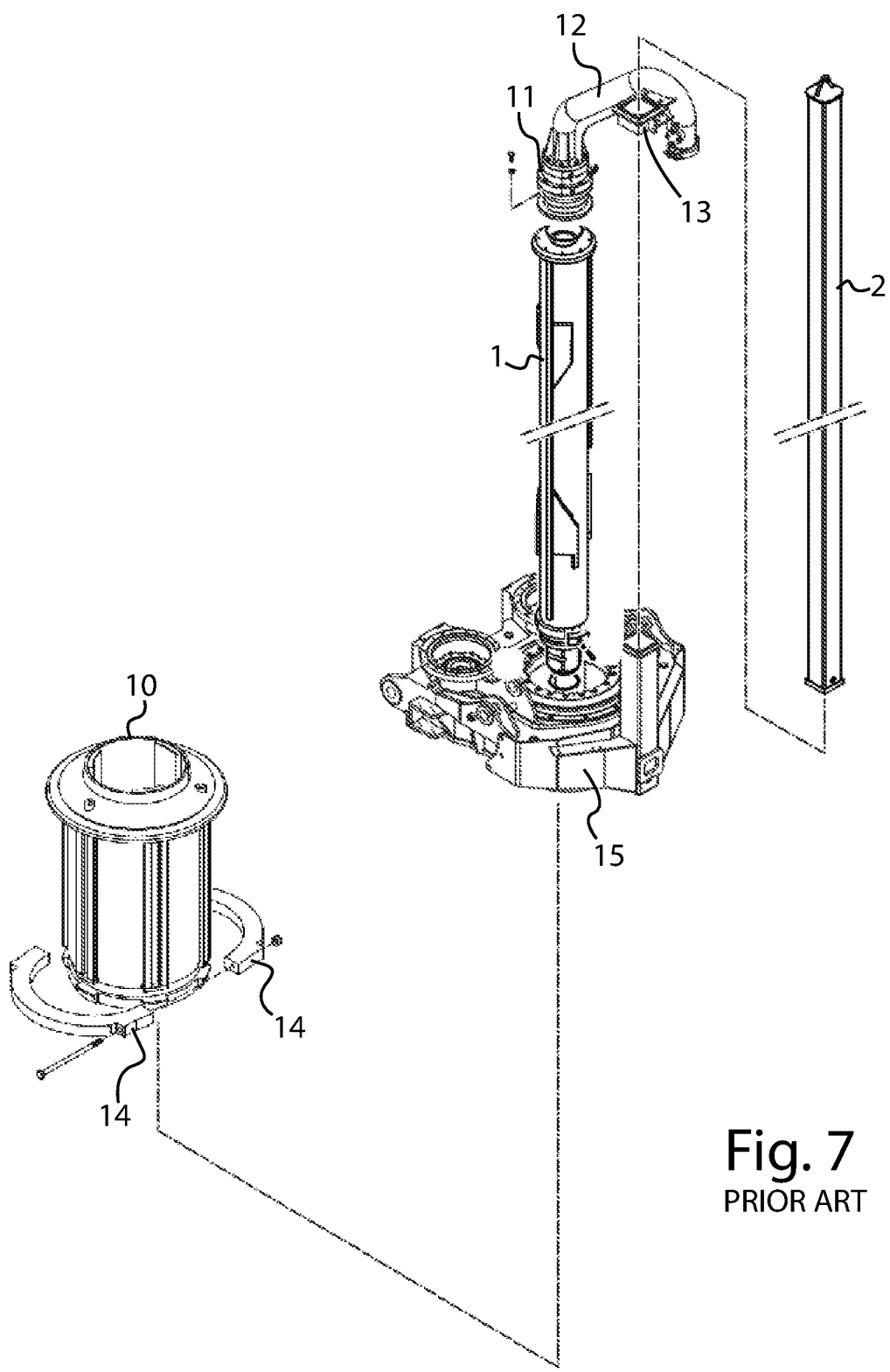
FIG. 7 is an exploded perspective schematic view of some components of the machine of FIG. 2 in which a broken line indicates the couplings between some of these components.

With reference to the figures, a drilling machine is shown, indicated overall with number 100.

Such drilling machine 100 is, in particular, of the single-pass type, e.g. suitable for CFA, or CSP, or CAP drilling technology, or a machine for compacting piles or displacement or TCT, or a machine for in-situ consolidation, (consolidation such as soilmixing, jet grouting, turbojet, cutter soil mix).

In the present discussion, the terms "lower" and "upper" refer to the position assumed by the various elements in a work configuration with the machine assembled and ready for drilling.

Furthermore, for all the elements of the drilling machine 100 that are present also in machines of the prior art, reference will be made to what is described above, illustrated in FIGS. 7, 8A-8E, using the same numerical references.

The drilling machine 100 comprises a self-propelled unit 110, e.g. provided with belts, with a rotating turret 120 comprising a cab for the operator, a power unit and all the control circuits. The drilling machine 100 further comprises a guide tower 130 that is connected to the rotating turret 120 so as to be able to rotate to pass from a configuration proximal to the horizontal (transport or assembly configuration) to one proximal to the vertical (work configuration).

The drilling machine 100 further comprises a string of drilling rods 60 comprising two or more drilling rods or segments coupled in succession with each other. The drilling rods can be smooth or have a helix conformation or can have radial blades located on the tip and sometimes also dislocated along the entire string. A drilling tool is coupled to the lower end of the string of rods such as, for example, an auger. The drilling machine 100 also comprises an extension element 1 having an upper end and a lower end where the latter is coupled to the upper end of the string of drilling rods 60; the drilling machine 100 also comprises a rotating or rotary head 15 slidably coupled to the guide tower 130. The rotary head 15 and the extension element 1 are mutually slidable and arranged to couple with each other in an upper end stop position in which the rotary head 15 is coupled with the extension element 1 substantially at the upper end of the extension element 1, and in at least one locking position in which the rotary head 15 is coupled with the extension element 1 at a lower position than the upper end stop position. The upper end stop position can be identified, for example, by an upper abutment portion of the upper end of the extension element 1.

This abutment portion is intended to provide a mechanical stop for the rotary head 15, e.g. for the cylindrical sleeve 17.

In the locking positions and in the upper end stop position, the rotary head 15 can move the extension element 1. In particular, in such at least one locking position the rotary head 15 can impart to the extension element 1 and therefore to the string of drilling rods 60 a pulling or thrust force or a rotation torque.

In particular, the extension element 1 is realized with a tube that has an internal passage, for example of about 3"-5" in diameter, and is provided with outer strips 16 adapted to engage with the rotary head 15. In detail, the extension element 1 is mounted so as to be able to slide through the rotary head 15 that has a rotating cylindrical sleeve 17 provided internally with engagement strips 18 that are engaged with the outer strips 16 of the extension element 1 to impart the movement torque.

The rotary head 15 may be provided with a diameter reducer 10, provided externally with strips adapted to engage with the inner strips of the cylindrical sleeve and internally with engagement strips intended to engage with the outer strips 16 of the extension element 1. The reducer 10 has the function of reducing the diameter of the internal passage of the rotary head, to bring it to a suitable dimension for coupling with the diameter of the extension element 1.

The expression engagement strips of the rotary head 15 is intended herein to indicate the engagement strips 18 of the cylindrical sleeve 17 or the engagement strips of the diameter reducer 10 should the latter be mounted and engaged in the cylindrical sleeve 17. When referring to the coupling between the rotary head 15 and the extension element 1 reference can therefore be made indifferently to the case in which the diameter reducer 10 is present or otherwise to the case in which such diameter reducer 10 is absent.

The cylindrical sleeve 17 and the possible diameter reducer 10 are the rotating parts of the rotating head 15 the main body of which is a non-rotating part. The outer strips 16 of the extension element 1 define, along the longitudinal extension of the extension element 1, one or more locking seats, for example bayonet, which identify respective locking positions. The extension element 1 is also provided with a joint 19 to be connected to the upper end of the string of drilling rods 60, so as to become integral with the string 60 and transmit the pull, thrust and torque to said string 60.

The locking seats are of the bayonet type and each of them has an upper abutment portion 50, substantially orthogonal to the longitudinal extension of the extension element 1, a first side abutment portion 51 and a second side abutment portion 52 opposite the first. The side portions 51, 52, in particular, extend longitudinally so that the longitudinal extension of the second side portion 52 is shorter than the longitudinal extension of the first side portion 51. The lower locking position is the most proximal one to the lower end of the extension element 1, i.e. proximal to the upper end of the string of drilling rods 60. According to the present invention, the drilling machine 100 also comprises a detection system configured to detect the reaching of the at least one locking position by detecting at least the mutual axial position of the extension element 1 and of the rotary head 15.

Preferably the detection system is configured to detect the lower locking position.

Preferably, the rotary head 15 and the extension element 1 are arranged to couple with each other in a plurality of such locking positions, and the detection system is configured to detect as well as the reaching of the lower locking position also the reaching of at least one of the locking positions interposed between the lower locking position and the upper end stop position.

In the rest of the description reference will be made for simplicity purposes to the detection of the lower locking position, being able to apply all the considerations to the case in which one or more locking positions higher than the lower one are to be detected. The rods of the string 60 have an internal conduit through which hardening material is passed into the excavation in order to realize the foundation pile gradually during the re-ascent of the drilling tool. The extension element 1 also has a through longitudinal internal conduit in fluid communication with the internal conduit of the rods of the string.

Figure 12:
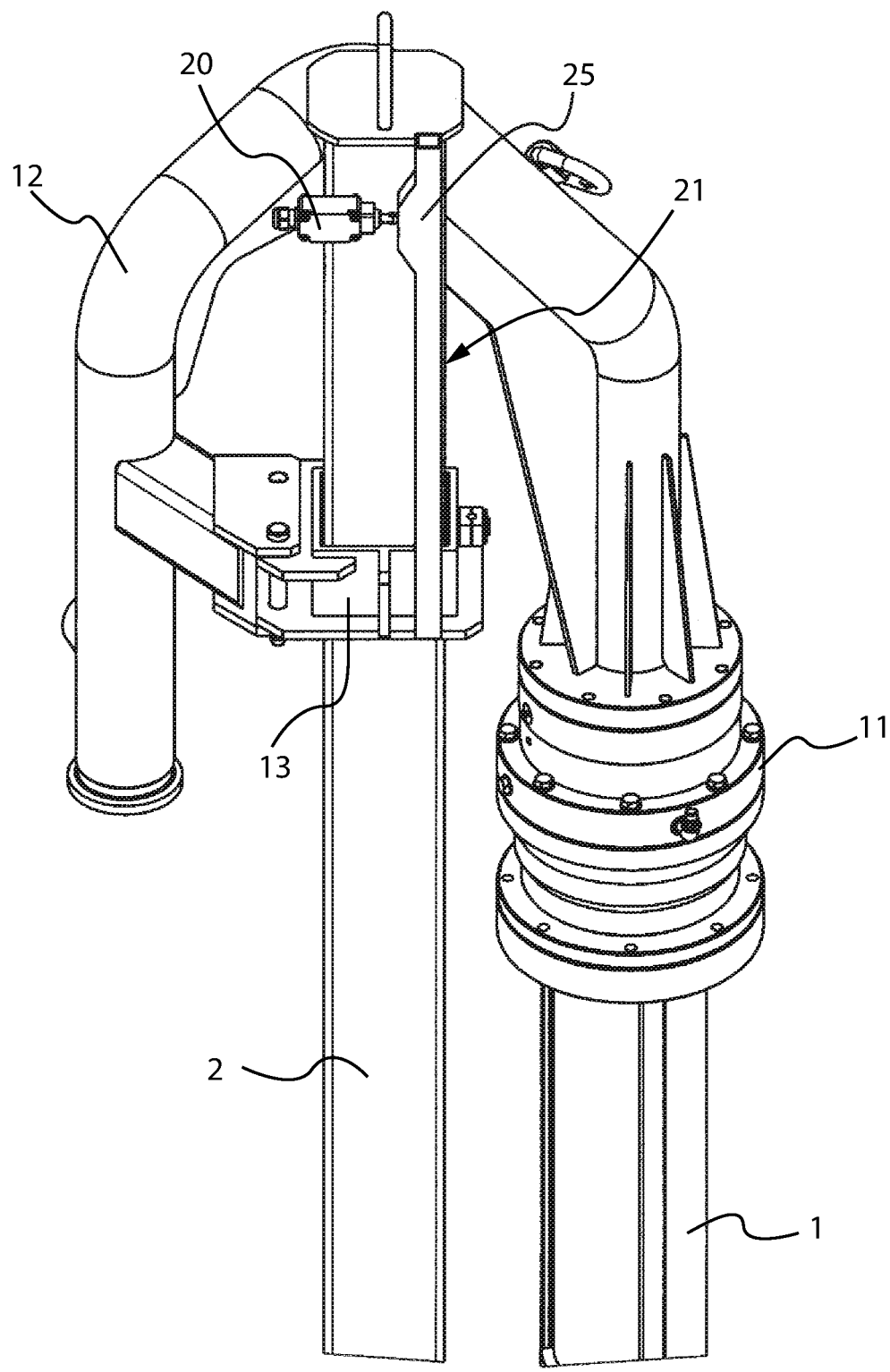
FIG. 12 is a schematic view of a detail of FIG. 9.
Figure 13:
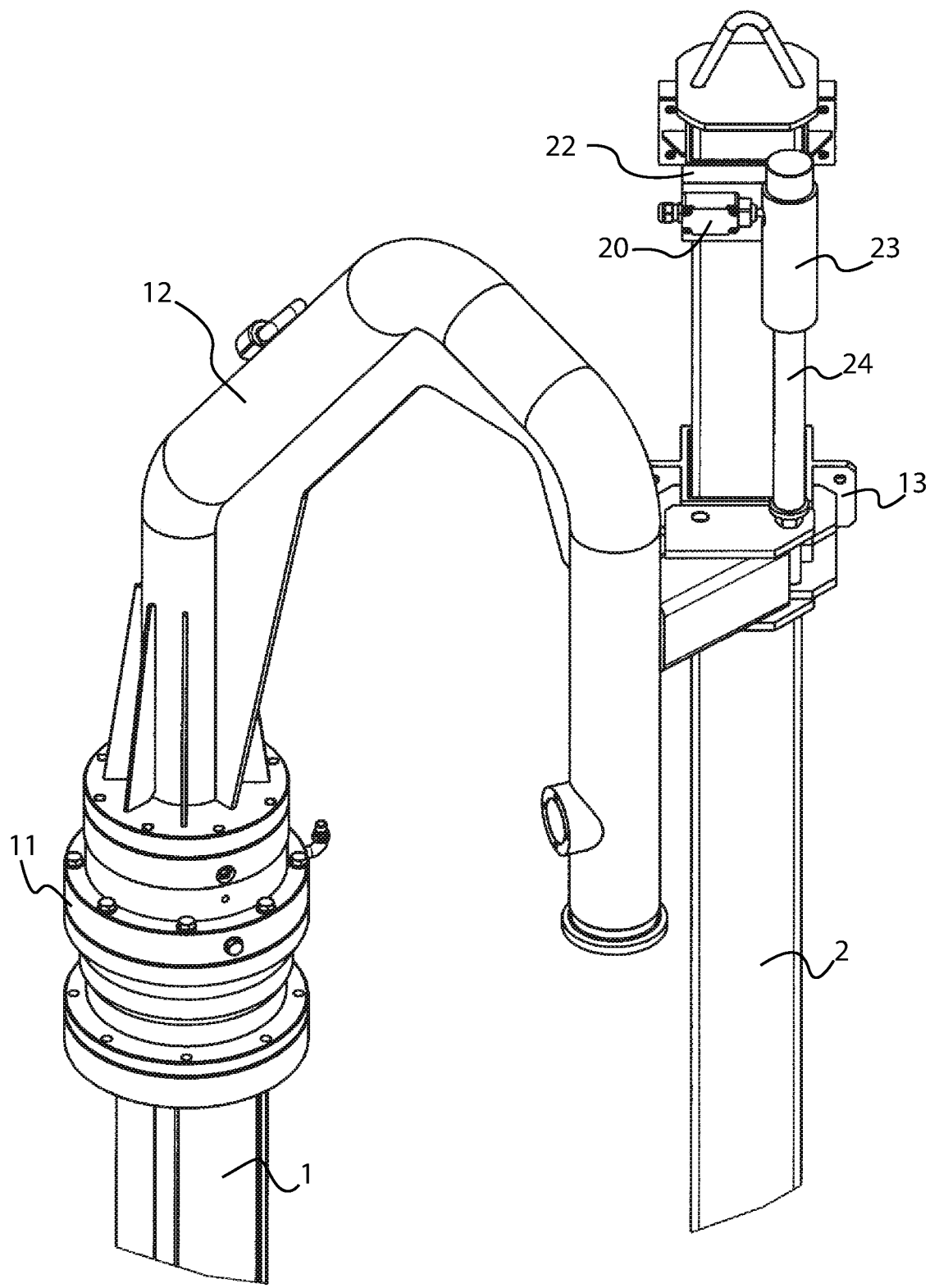
FIG. 13 is a schematic view of a detail of a further alternative embodiment of the drilling machine according to the present invention.

The upper end of the extension element 1 is coupled to a feeding tube 12 through the interposition of a rotary joint 11; in particular, as illustrated in FIGS. 12 and 13, the feeding tube 12 is arched and allows the passage of fluids inside it such as, for example drilling fluids or mixtures of fluids and air or cementitious mixtures, then conveying them into the internal conduit of the string of rods. The feeding tube 12 is then connected to a further tube, not shown, from which it receives the fluid to be injected into the excavation. It is convenient for the feeding tube 12 and the further tube connected thereto not to rotate with respect to the guide tower 130, maintaining a constant orientation and for this reason between the extension element 1 and the feeding tube 12 the rotary joint 11 is interposed which releases in rotation the extension element 1 from the feeding tube 12. The extension element 1 can therefore rotate integrally with the string of drilling rods 60 while the feeding tube 12 does not rotate.

The feeding tube 12 so as not to be drawn in rotation by the friction of the rotary joint 11 is coupled with a bar-type anchoring element 2 which is solidly fixed to the non-rotating part of the rotary head 15 and which extends parallel to the extension element 1. The bar-type anchoring element 2 can be advantageously constrained to the rotary head 15 removably in order to allow the dismantling thereof when the machine 100 is to be put in transport conditions.

FIG. 12 shows in detail the feeding tube 12 and how the same is constrained to the bar-type anchoring element 2. The feeding tube 12 is slidably coupled to the bar-type anchoring element 2 by means of a collar element 13. Such collar element 13 has a hollow section and appropriate dimensions to be coupled with the bar-type anchoring element 2 allowing such bar-type anchoring element 2 to cross the collar element 13. In one embodiment the bar-type anchoring element 2 comprises a square section tube, and the collar element 13 has a square section hollow such as to allow the passage of the bar-type anchoring element 2 with minimal clearance, so as to realize a prismatic coupling that allows relative sliding between the collar element 13 and the bar-type anchoring element 2 but that prevents mutual rotations between the bar-type anchoring element 2 and the collar element 13. When the extension element 1 slides axially through the rotary head 15, the feeding tube 12 and the collar element 13 integrally follow the movement of the extension element 1, whereas the bar-type anchoring element 2 remains axially fixed and integral to the rotary head 15.

Therefore, when the rotary head 15 is at the lower locking position of the extension element 1, the collar element 13 of the feeding tube 12 is at a certain predefined height of the length of the bar-type anchoring element 2, in particular it is in proximity to the top of the bar-type anchoring element 2. Such position is illustrated in FIG. 12.

Therefore the mutual position between the rotary head and the extension element 1 corresponding to the lower locking position can be detected indirectly by detecting the mutual position between the collar element 13 and the bar-type anchoring element 2, or by detecting the mutual position between the feeding tube 12 and the bar-type anchoring element 2.

The upper area of the bar-type anchoring element 2 is in a clean area of the machine, away from the dirt generated by the excavation tools and is on a body that does not rotate. The only movement present in this area is that of the mutual longitudinal sliding between the feeding tube 12 and the bar-type anchoring element 2. This area is therefore particularly adapted to the application of sensors.

The detection system preferably comprises at least one position sensor 20, 30, which can be of the lever or piston or proximity type, and at least one activator element 21, 24 where the at least one activator element 21, 24 is configured to activate the position sensor 20, 30.

The position sensor 20, 30 and the activator element 21, 24 are advantageously coupled directly or indirectly respectively to the rotary head 15 and to the extension element 1 or vice versa.

The position sensor 20, 30 and the at least one activator element 21, 24 are configured and positioned so that the at least one position sensor 20, 30 is activated by the at least one activator element 21, 24 when the rotary head 15 and the extension element 1 are in a predetermined locking position, e.g. the lower locking position.

Preferably, the position sensor 20, 30 and the activator element 21, 24 are advantageously coupled directly or indirectly to the bar-type anchoring element 2 axially integral to the non-rotating part of the rotary head 15 and the other directly or indirectly to the feeding tube 12 integral with the extension element 1 and vice versa.

Figure 8:
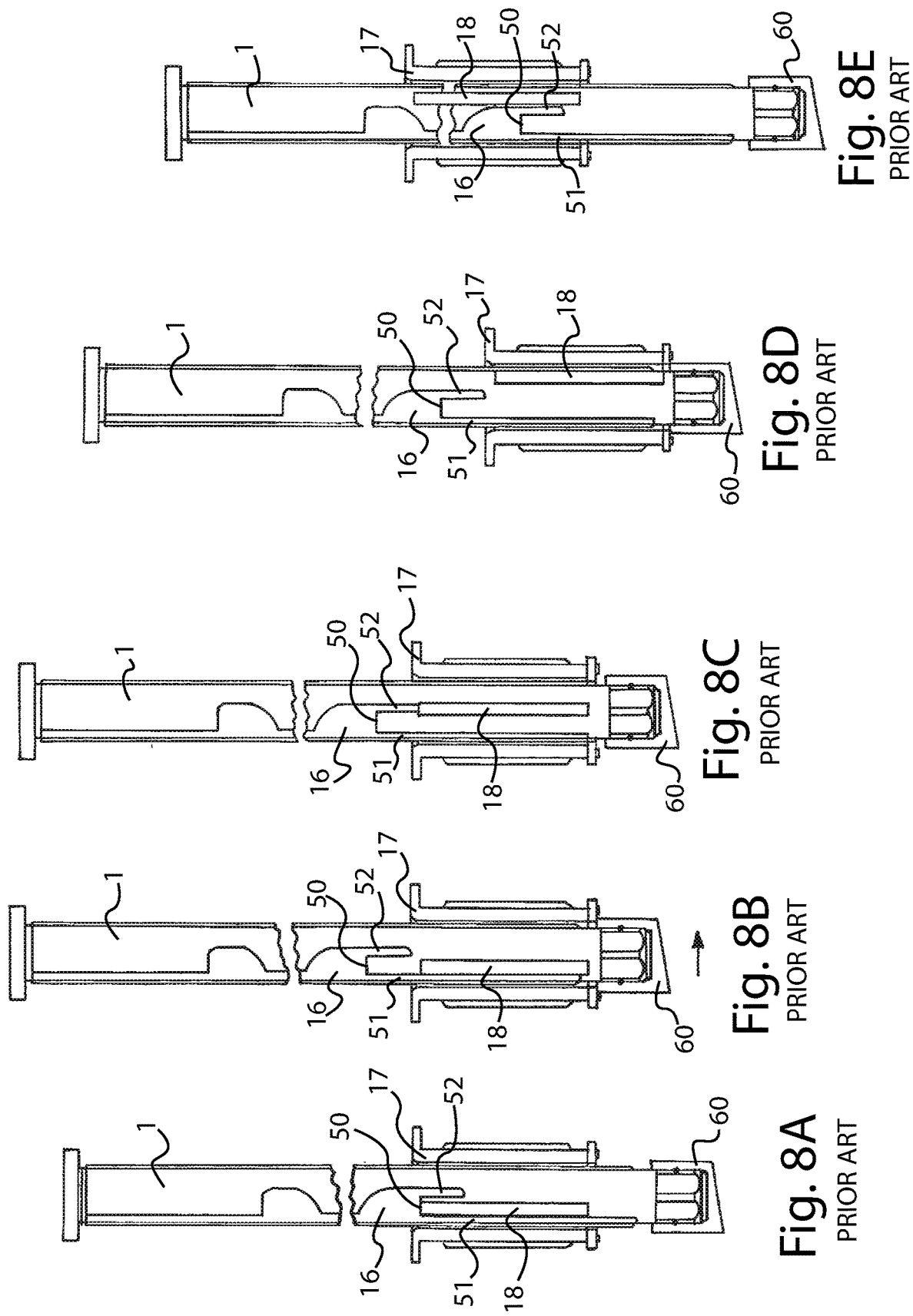
FIG. 8A is a schematic view of an extension element and a cylindrical sleeve of a rotary head engaged in a lower locking position.
FIG. 8B is a schematic view of the extension element and of the cylindrical sleeve of FIG. 8A in a disengaged position.
FIG. 8C and FIG. 8D are two schematic views that show two subsequent steps of the anticlockwise rotation of the cylindrical sleeve around the extension element of FIG. 8B.
FIG. 8E is a schematic view in which the cylindrical sleeve of FIGS. 8A-8D was made to slide upwards with respect to the extension element.

The position sensor 20, 30 and the activator element 21, 24 are in particular arranged so that the activator element 21, 24 activates the position sensor 20, 30 which, therefore, detects the presence thereof, at one of the locking positions, e.g. the lower locking position, i.e. when the engagement strip of the rotary head 15 is in the position of FIG. 8A, slightly before coming into contact with the upper abutment portion 50 of the locking seat.

In the event in which more than one locking seat is provided and therefore more than one locking position and the detection system is able to detect the reaching of each of said locking positions, the detection system can comprise a plurality of position sensors 20, 30 positioned so that their activation by means of the detection of the presence of the activation element 21, 24 corresponds to the engagement of the rotary head 15 in a respective locking seat.

Figure 14:
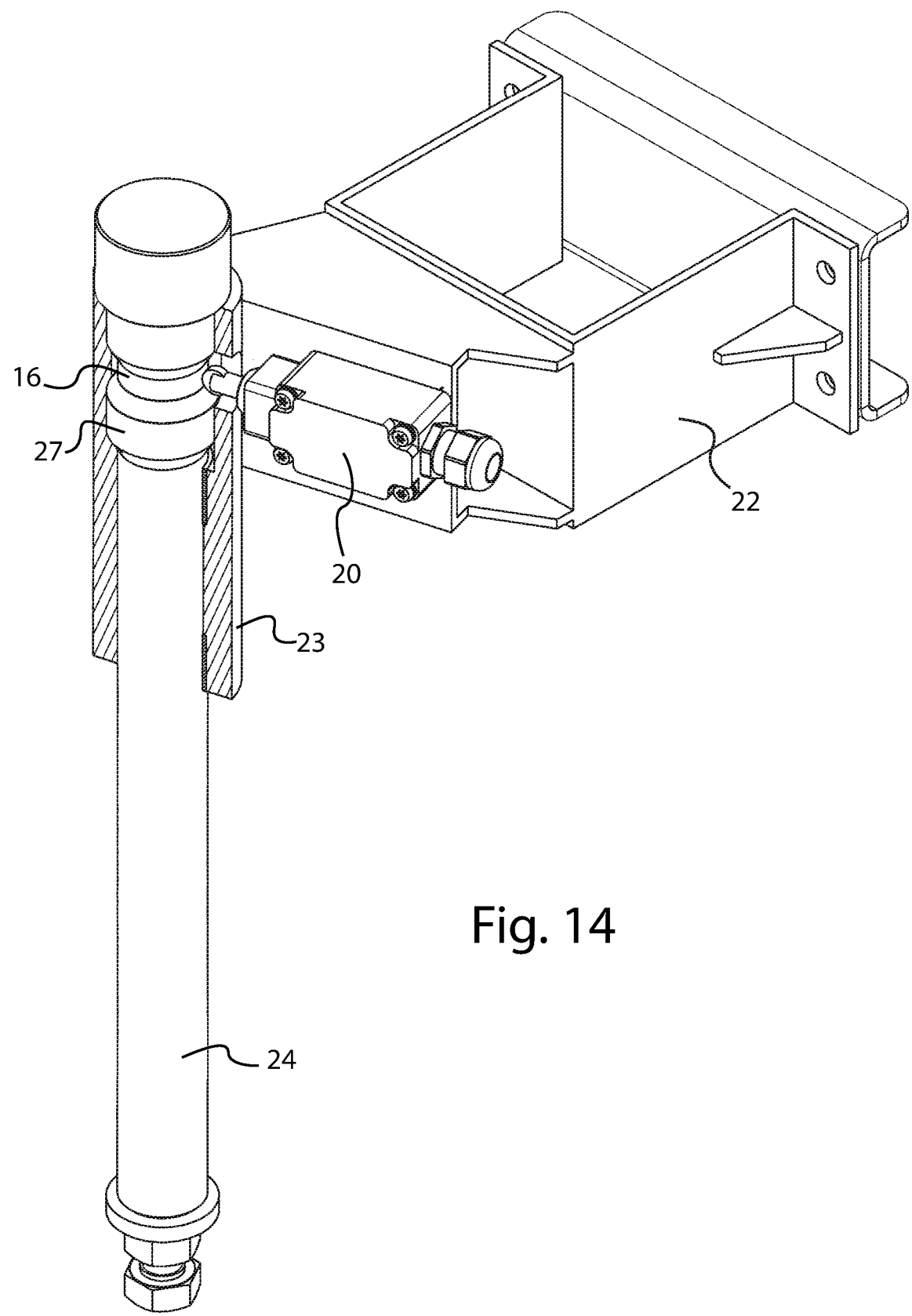
FIG. 14 is a schematic view of a detail of FIG. 13.

Preferably, the at least one position sensor 20 is a lever or piston type sensor and the activator element is a cam element 21, 24, as in the embodiments illustrated in FIGS. 12, 13 and 14. Lever or piston sensor means a sensor that has a retractable lever or piston which when pressed activate the sensor.

Preferably, the at least one position sensor 20, 30 is provided with a power supply battery.

Preferably, the at least one position sensor 20, 30 is configured to transmit signals in wireless mode.

In the embodiment illustrated in FIG. 12 the position sensor 20 is fixed to the bar-type anchoring element 2, whereas the cam element 21 is fixed to the collar element 13. The cam element 21, as can be observed in FIG. 12, has a projecting portion 25 configured to actuate, when it opposes the position sensor 20, the lever or piston of the position sensor 20 so as to activate it. In this way, the position sensor 20 is activated by the cam element 21 when the collar element 13 with its translation brings the projecting portion 25 to the lever or piston of the position sensor 20. Therefore, the position of the position sensor 20 and the length of the cam element 21 and of the projecting portion 25 thereof can be appropriately selected so that the cam element 21, moving integrally with the extension element 1 is in the activation position of the position sensor 20 only when the rotary head 15 is in one of the locking positions, for example in the lower locking position. In other words, when the position sensor 20 is activated by the cam element 21 it means that the engagement strips of the rotary head are positioned axially in an exact way at the corresponding locking seat provided on the extension element 1, as shown in FIG. 8A. The length of the cam element 21 depends on the length of the second side longitudinal portion 52 of the locking seat. The length of the cam element 21, in particular, is shorter than the axial displacement that the engagement strip of the rotary head 15 has to perform to pass from the locking position shown in FIG. 8A to the disengagement position shown in FIG. 8B.

When the rotary head 15 is in an uncertain coupling position, as shown in FIG. 8C, the extension element 1 is in a higher position with respect to the rotary head 15 compared with the position in which it is located if there is correct coupling in the lower locking seat. Therefore, in such uncertain locking condition the cam element 21 is at a higher height with respect to the position sensor 20 and does not activate it.

The detection system further comprises an electronic processing and control unit (not illustrated) associated with the position sensor 20 so as to be able to receive therefrom the detection signal generated by the position sensor 20 when it detects the correct locking position; the electronic processing and control unit is configured to process the detection signal and generate a warning signal for the operator. In particular, this warning signal may be acoustic or visual. For example, in a control panel provided in the cab, a green light can be activated that provides an indication to the operator of the successful coupling. Alternatively an ideogram or written message can be generated on a display in the cab. In a further variant, a light may light up on a dashboard to enable the drilling or movement of the rotary head 15.

Preferably, the electronic processing and control unit is configured to enable a manoeuvre when it receives the detection signal generated and to prevent such manoeuvre in the absence of such detection signal. Such enabled manoeuvre could be for example the translation of the machine 100 through the activation of belts, which would be particularly dangerous in the event of uncertain locking, as the vibrations produced could cause the sudden release of the extension element 1 with consequent "free fall" according to the methods already explained.

The position sensor 20 may be constrained to the bar-type anchoring element 2 in a removable way and may be longitudinally adjustable so as to find the correct position for signalling the successful locking.

The position sensor 20 can be connected to the electronic processing and control unit so as to be also electrically powered or may be battery powered. The connection to the electronic processing and control unit may be of the wireless or wired type through a cable; in that case, the cable can be advantageously made to pass into an internal conduit of the bar-type anchoring element 2, exiting at the base of the bar-type anchoring element 2, in proximity to the rotary head 15. Preferably, the cable is provided with connectors at the end that exits from the bar-type anchoring element 2, so as to be able to be disconnected as required.

The cable that brings the power supply from the rotating turret to the position sensor 20 can follow the same path followed by the hydraulic pipes and by the electrical cables that bring the power supply to the rotary head 15.

In an alternative embodiment of the detection system illustrated in FIG. 13 the position sensor 20 of the lever or piston type is mounted on a support structure 22 constrained so as to be integral with the bar-type anchoring element 2, e.g. mounted in a position above the collar element 13. In this case, therefore, the position sensor 20 is coupled indirectly to the bar-type anchoring element 2 and therefore to the rotary head 15. The support structure 22 can also be collar shaped and is axially locked to the bar-type anchoring element 2, e.g. by means of screws, or through welding, or through a clamp-hooking system so as to be longitudinally adjustable. The support structure 22 comprises a guide tube 23 of the activation element 21 arranged with the axis parallel to the bar-type anchoring element 2. In this embodiment, the activation element is a cam element 24 realized as a cylindrical pusher 24 slidable or floating inside the guide tube 23. Such cylindrical pusher 24 has a projecting portion 27 realized as a cylindrical portion with an increased diameter as illustrated in FIG. 14.

In the particular embodiment of FIG. 14, the cylindrical pusher 24 has at the top a support portion adapted to abut with the top end of the guide tube 23; furthermore, in its upper stretch which remains engaged inside the guide tube 23, the cylindrical pusher 24 has a groove, e.g. circumferential, 26 delimited at the bottom by the projecting portion with the increased diameter 27 that has a cam function. In this embodiment the position sensor 20 is positioned so that the sensitive member, i.e. the lever or piston, crosses an opening present in the wall of the guide tube 23, and engages in the groove 26 of the cylindrical pusher 24. When the sensitive member of the position sensor 20 is at the groove 26 of the cylindrical pusher 24, the position sensor 20 is not activated. When instead the cylindrical pusher 24 is moved by sliding upwards into the guide tube 23, the projecting portion 27 presses against the lever or the piston of the sensor 20 activating the position sensor 20.

The cylindrical pusher 24 has a length such as to come into contact with the collar element 13 shortly before the rotary head 15 reaches the lower locking position on the extension element 1. The cylindrical pusher 24 assumes a raised position when the rotary head 15 is in the lower locking position and in such position it activates the position sensor 20. In detail, when the rotary head 15 slides downwards to be engaged in the lower locking seat, the collar element 13 and the feeding tube 12 slide axially towards the upper part of the bar-type anchoring element 2, moving towards the cylindrical pusher 24. In proximity to the lower locking condition, the collar element 13 enters into contact with the cylindrical pusher 24 and when the rotary head 15 is exactly in the lower locking position the cylindrical pusher 24 is raised with respect to the guide tube 23 causing the activation of the position sensor 20. When the collar 13 slides away from the position sensor 20 the cylindrical pusher 24 slides downwards due to its own weight and the effect of a spring.

This embodiment of the detection system is advantageously insensitive to the clearance present between the collar element 13 and the bar-type anchoring element 2, which must be present to allow easy mutual sliding. In fact, the cylindrical pusher 24 being guided by the guide tube 23 always remains at a correct radial distance with respect to the position sensor 20 guaranteeing the correct operation thereof. The contact between the lower part of the cylindrical pusher 24 and the collar element 13 is instead guaranteed also in the case of rather significant lateral displacements of the collar element 13, e.g. due to clearance, as the surface on which such contact can take place is very large.

Furthermore, the cylindrical pusher 24 can have in the lower part an axially adjustable end, e.g. a screw regulator, so as to be able to adjust the mutual start position of the contact between the collar element 13 and the cylindrical pusher 24.

In an alternative embodiment of the detection system, such system comprises a distance measurer configured to measure the distance between the rotary head 15 or the bar-type anchoring element 2 and the collar element 13 or the feeding tube 12. For example, such distance measurer can be a cable depth gauge having at a first end a cable and at a second end a winder with a cable and rotary encoder pulled by the cable. Such first end is fixed to the rotary head 15 or to the bar-type anchoring element 2 and the second end is fixed to the collar element 13 or to the feeding tube 12. The mutual longitudinal stroke, i.e. the mutual axial position between the parts is detected and, therefore, upon the verification of the known distance, corresponding to a locking position, the warning signal is generated. Also in this embodiment, the detection system comprises an electronic processing and control unit that receives the measurements performed by the distance measurer, e.g. a depth gauge, and generates the warning signals as the known distance is verified.

Alternatively, the distance measurer may be of the laser type between the rotary head 15 or the bar-type anchoring element 2 and the collar element 13 or the feeding tube 12. The distance measurer of the laser type measures the mutual axial position between the extension element 1 and the rotary head 15. Also in this embodiment, the detection system comprises an electronic processing and control unit that receives the measurements performed by the laser distance measurer and generates the warning signals as the known distance corresponding to a locking position is verified.

In a further alternative embodiment of the detection system, the position sensor is a proximity sensor 30 able to detect the presence of objects in the near vicinity; such proximity sensor may be of the inductive type, or capacitive type, or magnetic type, or ultrasound type or optical type. In any case, the absence of mechanical actuation mechanisms, and physical contact between the sensor and the object, ensures that these sensors have high reliability. The embodiment that provides the use of a magnetic type proximity sensor is described below by way of example. In this case, the activation element is a permanent magnet insert. The magnetic proximity sensor 30 can be directly or indirectly coupled to the bar-type anchoring element 2 or to the rotary head 15 and a permanent magnet insert can be applied directly or indirectly to the collar element 13 or to the feeding tube 12; in particular, the permanent magnet insert is positioned in a position such for which when the rotary head 15 and the extension element 1 are in the lower locking position the permanent magnet insert is located at the proximity sensor 30. In this condition, when the permanent magnet insert activates the magnetic type proximity sensor the latter generates the detection signal. Also in this embodiment, the detection system comprises an electronic processing and control unit that receives the detection signal and generates the warning signals as the lower locking position is verified.

In the event in which the proximity sensor is of the inductive type comprising an electromagnet, it is able to detect ferromagnetic material such as steel only at a sufficiently small reduced distance, in general a few mm. Such inductive proximity sensor may be fixed for example onto the collar 13 or onto the collar element or onto the feeding tube 12. In that case, a compartment or hole is realized on the bar-type anchoring element 2 or on the rotary head 15. In particular, the compartment or hole must be realized so that in the locking position that is to be detected, such compartment or hole is at the inductive proximity sensor. The inductive proximity sensor, at a vacuum, no longer detects the presence of ferromagnetic material and therefore the signal generated by the sensor will have a negative peak that an electronic processing and control unit, also present in this embodiment, recognises as indicative of the locking position. In this case the activation element is the compartment or hole made in the rotary head 15 or in the bar-type anchoring element 2 or in elements integrally connected thereto.

For the purpose of the present invention it is underlined that the mutual position of the position sensors and of the activation elements of such sensors can be inverted with respect to the description provided. For example, with reference to the solution of FIG. 12, the position sensor 20 may be fixed to the collar element 13 and the cam element 21 to the bar-type anchoring element 2. In that case the power supply cable of the position sensor 20 follows the feeding tube 12 and can be connected to the cable already present on the feeding tube 12 and that supplies current to the measurement sensor of the injection pressure, therefore, not causing any complication of the electrical system.

In a further embodiment illustrated in FIGS. 15A, 15B, 15C the position sensor is a proximity sensor 30 of the inductive or magnetic type arranged on the rotary head 15 advantageously on the rotating part thereof i.e. integral with the cylindrical sleeve 17 or integral with the diameter reducer 10. The cylindrical sleeve 17 of the rotary head 15 crosses longitudinally and can project both above and below the rotary body and can be provided with an upper flange and/or a lower flange to which the diameter reducer 10 can be coupled. The diameter reducer 10 once inserted and engaged in the cylindrical sleeve 17 of the rotary head 15 has a predetermined and fixed angular position; furthermore, the diameter reducer 10 longitudinally crosses the whole cylindrical sleeve 17 projecting above and/or below it. The extension element 1, once mounted, longitudinally crosses both the cylindrical sleeve 17 and the diameter reducer 10 and, in all the mutual longitudinal positions that it can assume, it always projects above and below the cylindrical sleeve 17 and the diameter reducer 10.

Figure 9:
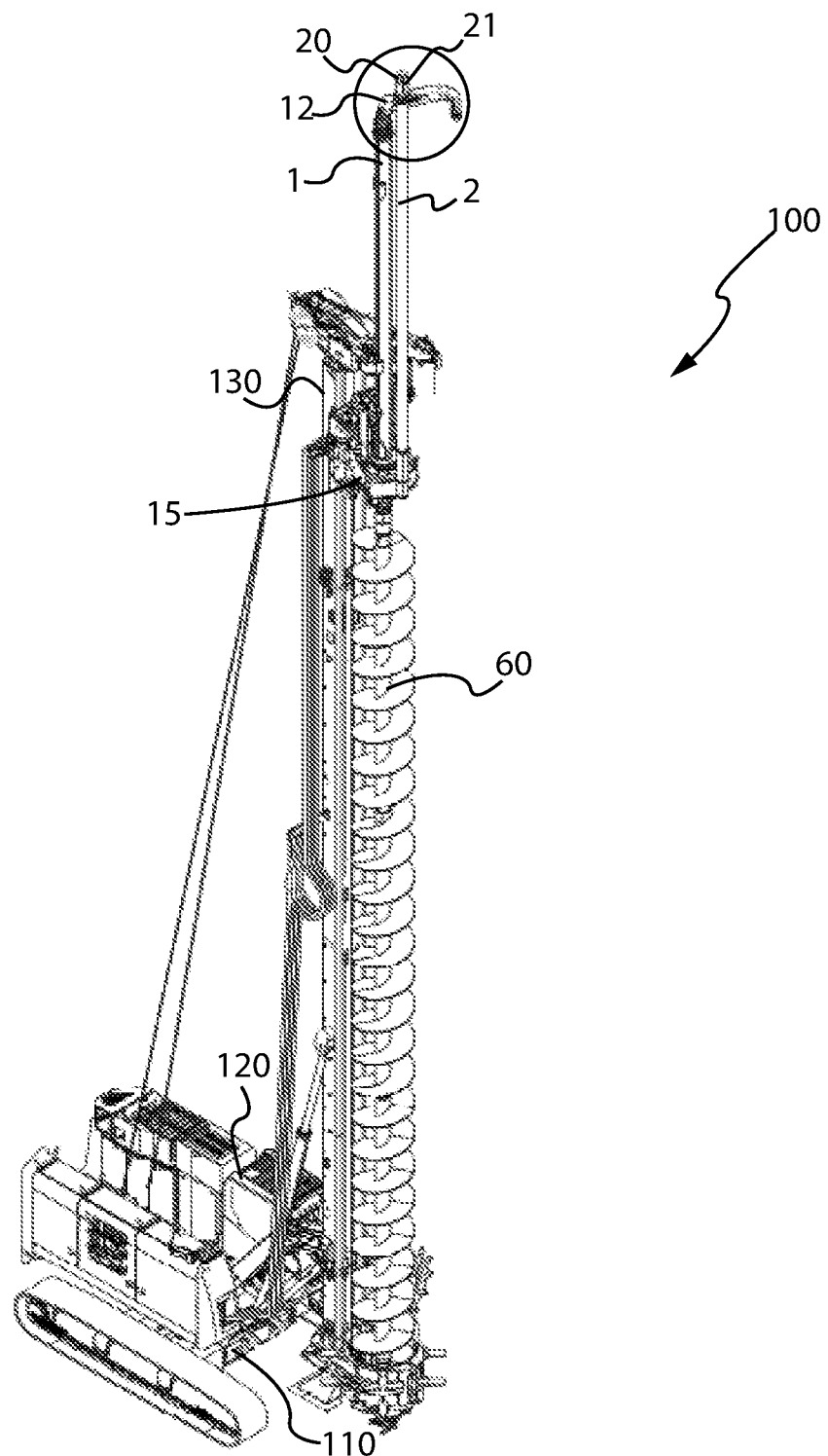
FIG. 9 is a perspective schematic view of an embodiment of a drilling machine of the single-pass type suitable for CFA drilling technology according to the present invention.

The proximity sensor 30 visible in FIG. 9C is integrally constrained to the diameter reducer 10 or to the cylindrical sleeve 17, preferably below the body or below the case or the frame that contains the gears of the rotary head 15, so as to face the part that projects below the diameter reducer 10 or, more preferably, below the lower end of the diameter reducer 10.

In the event in which the proximity sensor 30 is constrained to the diameter reducer 10, in particular to the side wall thereof at the stretch that projects longitudinally with respect to the cylindrical sleeve 17, such diameter reducer 10 has a hole 32 in the wall at the proximity sensor 30, so that the proximity sensor 30 can detect the presence of an activation element that is inside the diameter reducer 10.

In the event in which the proximity sensor 30 is of the magnetic type, the activation element is a permanent magnet insert advantageously fixed onto the extension element 1 in a predetermined axial and angular position. In detail, when the engagement strips of the rotary head 15 are in the lower locking position, the permanent magnet insert will be exactly at the hole present on the part of the diameter reducer 10 and therefore at the proximity sensor 30, thus exciting such proximity sensor 30 for generating a warning signal of the successful locking. In one variant the proximity sensor 30 can be fixed to the side wall of the cylindrical sleeve 17 of the rotary head 15, at the stretch of cylindrical sleeve 17 that projects longitudinally with respect to the rotary head 15. In that case the operation is very similar to that just described but a hole must be made both on the side wall of the cylindrical sleeve 17 and on the side wall of the diameter reducer 10, with both holes positioned at the proximity sensor 30 so that the proximity sensor 30 can detect the presence of an activation element that is inside the diameter reducer 10.

Figure 10:
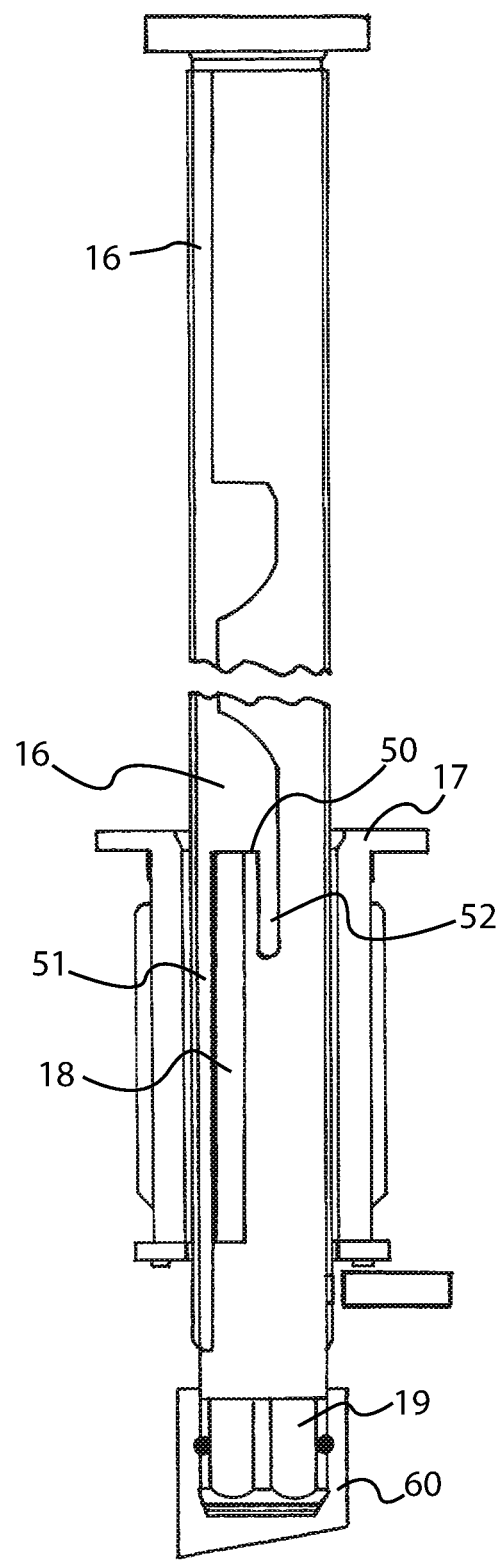
FIG. 10 is a schematic view of a detail of an embodiment of the drilling machine according to the present invention.

In a further embodiment shown in FIG. 10 the proximity sensor 30 is constrained to the diameter reducer 10 or to the cylindrical sleeve 17 and positioned so that it is located below the lower end of the diameter reducer 10, and at the stretch of extension element 1 that projects below the diameter reducer 10 and the cylindrical sleeve 17. In this case the permanent magnet insert is fixed onto the extension element 1 in a predetermined axial and angular position. In detail, when the engagement strips of the rotary head are in the lower locking position, such permanent magnet insert is in the projecting stretch of the extension element 1 at the proximity sensor 30. The proximity sensor 30 can also work in the presence of dirt. The proximity sensor 30 is preferably constrained so that it is removable, therefore it could be installed and maintained on the machine only during the steps in which it is necessary to monitor the locking, e.g. during the assembly and disassembly of strings of rods or helices. The battery-powered proximity sensor 30 may be provided with a switch to be turned off while it is not being used, in order to increase the endurance of the batteries.

In the embodiments illustrated in FIGS. 15A, 15B, 15C the proximity sensor 30 detection signal is generated only when both the axial position and the angular position of the engagement strip of the rotary head 15 corresponds to a predetermined locking position and therefore the engagement strip besides being at the correct axial height is simultaneously also in the correct angular position.

Figure 11:
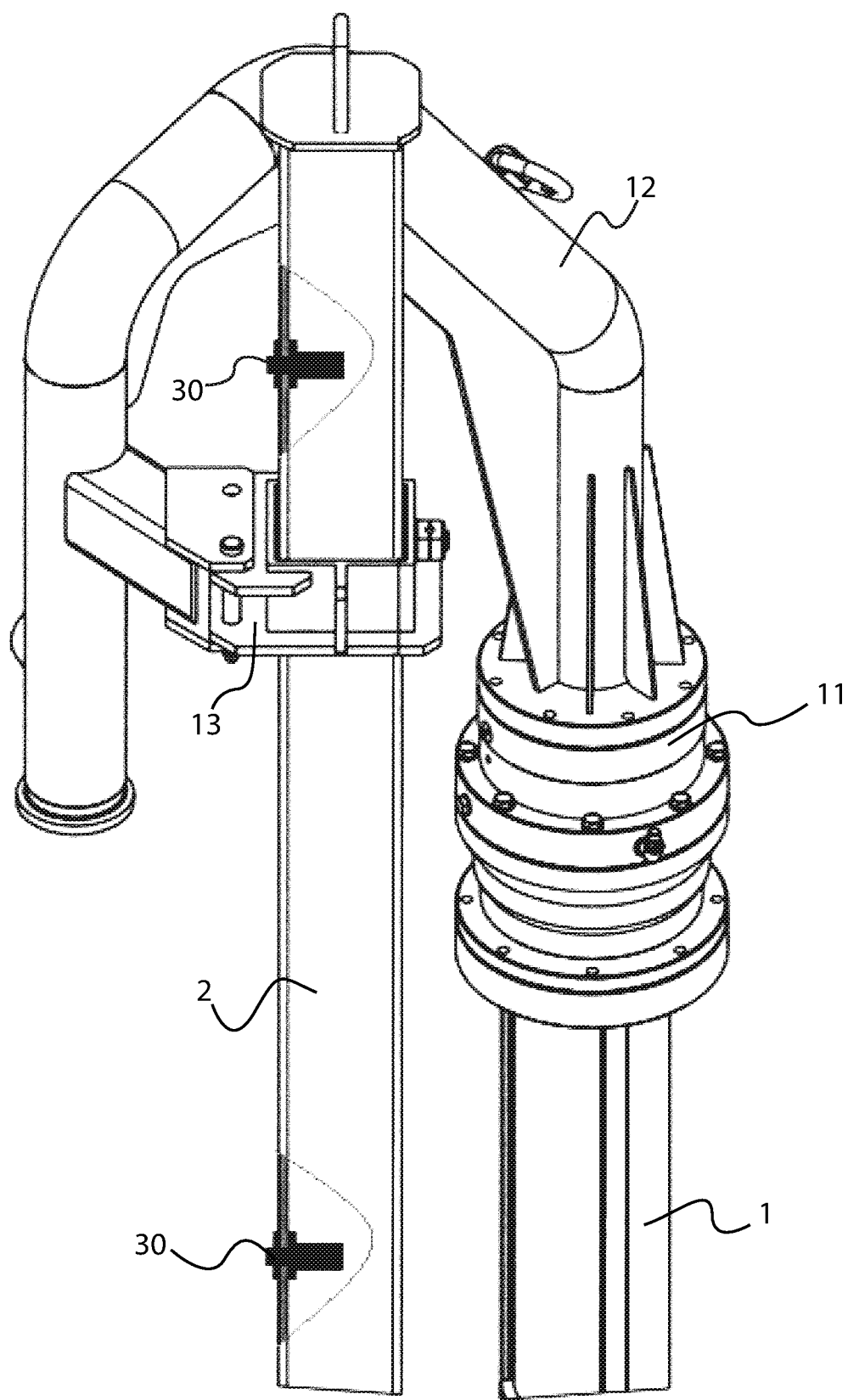
FIG. 11 is a schematic view of a detail of an alternative embodiment of the drilling machine according to the present invention.

The detection system can also comprise a plurality of sensors to detect other angular positions or to possibly detect also the uncertain locking position. FIG. 11 shows an embodiment in which at least one proximity sensor 30 is located partially inside the bar-type anchoring element 2. The sensitive portion of the proximity sensor 30 that performs the detection faces the outer part of the bar-type anchoring element 2, passing through a hole made in the wall of the bar-type anchoring element 2. In that case, the proximity sensor 30 is positioned so that when the rotary head 15 is correctly coupled in the lower locking seat of the extension element 1, the collar element 13 sliding on the bar-type anchoring element 2 is positioned at the sensor, activating it. The sensor then generates a signal indicative of the correct lower locking position between the rotary head 15 and the extension element 1. In the event in which the extension element 1 is provided also with a locking seat in intermediate position with respect to the length thereof, it is possible to apply a second proximity sensor 30 in a lower position along the bar-type anchoring element 2 with respect to the previous sensor. Such second proximity sensor 30 is activated by the passage of the collar element 13 when the rotary head 15 is in the intermediate fitting position of the extension element 1. The second proximity sensor 30 then generates a second signal indicative of the correct intermediate fit, which is treated independently with respect to the first signal.

In the event in which the extension element 1 is also provided with one or more locking seats in the intermediate position with respect to the length thereof, it is possible to apply a plurality of position sensors 20 arranged along the bar-type anchoring element 2, which are activated by a single cam element 21, 24. In this case, each sensor is adapted to detect a different locking position. In this case, the collar element must have a shape such as not to cut the intermediate position sensor 20 when it passes in front of it. In a further embodiment, the position sensors 20 may for example be arranged on opposite sides of the bar-type anchoring element 2 and, in that case, the position sensors 20 are activated by corresponding cam elements 21, 24 arranged on opposite sides with respect to the bar-anchoring element 2.

Figure 16:
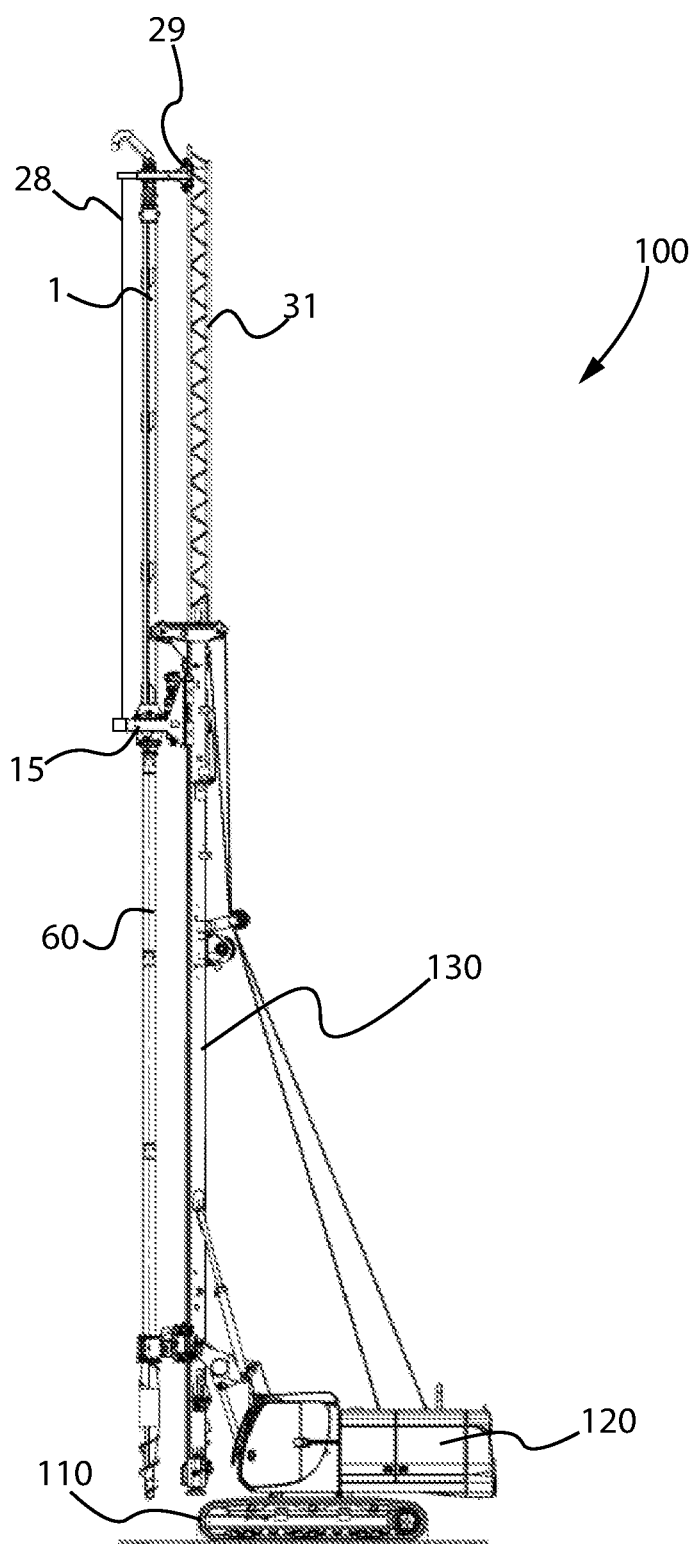
FIG. 16 is a schematic view of a further alternative embodiment of the drilling machine according to the present invention.

In the case in which the extension element 1 also extends above the guide tower of the rotary head 15, lattice elements 31 are arranged above the guide tower 130, on which the extension element 1 is guided through a guide trolley 29 slidably coupled with the lattice elements 31, as shown in FIG. 16; in that case, it is possible to detect the relative position between the extension element 1 and the rotary head 15 by measuring the relative position between the rotary 15 and the guide trolley 29 of the extension element 1.

The guide trolley 29 is fixed to the extension in proximity to the rotary joint 11, and maintains a fixed axial position with respect to the extension element 1, and can slide on the lattice elements 31 integrally following the movement of the extension element 1. This measurement can be detected with distance measurers such as: depth gauges, cable winders with rotary encoders, laser sensors or the like. For example, distance measurers of the laser type can be fixed integrally to the rotary head 15 and measure the distance from the guide trolley 29, or can be fixed to the guide trolley 29 and measure the distance from the rotary head 15. In the case of distance measurers such as cable depth gauges, they will have an unwound end of the cable connected to the rotary head 15 and the winding body fixed to the guide carriage 29 or vice versa.

When the position of the rotary head 15 along the guide tower has already been detected (e.g. with measurement devices on a movement winch of the rotary head, or with direct detections of the current position along the tower) it is possible to measure the absolute position of the guide carriage 29 (i.e. with respect to a fixed point of the tower or of the lattice elements) and then proceed by taking the difference between the measurements of the positions for obtaining the relative position. Alternatively, it is also possible in this case to perform a direct measurement of the distance between the guide trolley of the extension and the rotary head, using the methodology already explained.

From the above description the features of the drilling machine of the present invention, as well as the advantages thereof, are evident.

Finally, it is to be understood that the drilling machine as conceived herein is susceptible to many modifications and variations, all falling within the invention; furthermore, all the details are replaceable by technically equivalent elements. In practice, the materials used, as well as the dimensions, can be of any type according to the technical requirements.

The invention claimed is:
1. A single-pass type drilling machine, comprising:
a guide tower;
a string of drilling rods;
an extension element having an upper end and a lower end, wherein said lower end is coupled with an upper end of said string of drilling rods;
a rotary head slidably coupled with said guide tower, wherein said rotary head and said extension element are mutually slidable; said extension element is provided with outer strips adapted to engage with said rotary head; said outer strips of the extension element define, along a longitudinal extension of the extension element, one or more locking seats identifying one or more locking positions; and said rotary head and said extension element are arranged to couple with each other
- in an upper end stop position in which said rotary head is coupled with said extension element substantially at said upper end of said extension element, and
- in at least one locking position in which said rotary head is coupled with said extension element at a lower position with respect to said upper end stop position and said rotary head imparts to said extension element and said string of drilling rods a pulling or thrust force or a rotation torque; and a detection system configured to detect reaching of said at least one locking position by detecting at least a mutual axial position of said extension element and said rotary head, wherein said detection system comprises an associated electronic processing and control unit configured to generate a warning signal for an operator when said at least one locking position is detected.

2. The drilling machine according to claim 1, wherein said detection system is configured to detect a lower locking position that is a locking position closest to the lower end of said extension element.

3. The drilling machine according to claim 2, wherein said rotary head and said extension element are arranged to couple with each other in a plurality of locking positions, and said detection system is configured to detect reaching of at least one of said locking positions arranged between said lower locking position and said upper end stop position.

4. The drilling machine according to claim 1, wherein
- said detection system comprises at least one position sensor and at least one activator element configured to activate said at least one position sensor;
- said at least one position sensor and said at least one activator element are coupled directly or indirectly respectively with said rotary head and with said extension element or vice-versa; and
- said at least one position sensor and said at least one activator element are configured and positioned so that said at least one position sensor is activated by said activator element when said rotary head and said extension element are in a predetermined locking position of said at least one locking position.

5. The drilling machine according to claim 4, wherein said position sensor is of a lever type or of a piston type and said activator element is a cam element.

6. The drilling machine according to claim 5, wherein
- the upper end of said extension element is coupled with a feeding tube,
- a bar-type anchoring element is coupled with a non-rotating part of said rotary head,
- said bar-type anchoring element extends substantially parallel to said extension element,
- said feeding tube is slidably coupled with said bar-type anchoring element through a collar element,
- said position sensor is coupled with said bar-type anchoring element, and
- said cam element is coupled with said collar element.

7. The drilling machine according to claim 6, wherein
- said position sensor is directly or indirectly coupled with said bar-type anchoring element,
- a guide tube is directly or indirectly coupled with said bar-type anchoring element with an axis parallel to said bar-type anchoring element,
- said cam element is a cylindrical pusher sliding inside said guide tube,
- said cylindrical pusher has a projecting portion having increased diameter, and
- said projecting portion is adapted for activating said position sensor.

8. The drilling machine according to claim 4, wherein said position sensor is a proximity sensor.

9. The drilling machine according to claim 8, wherein said proximity sensor is arranged on a rotating part of said rotary head and said activation element is fixed to said extension element in a predetermined axial and angular position.

10. The drilling machine according to claim 8, wherein
- the upper end of said extension element is coupled with a feeding tube,
- a bar-type anchoring element is coupled with a non-rotating part of said rotary head,
- said bar-type anchoring element extends substantially parallel to said extension element,
- said feeding tube is slidably coupled with said bar-type anchoring element through a collar element,
- said proximity sensor is arranged partially inside said bar-type anchoring element so that a sensitive portion of the proximity sensor that carries out detection faces onto an outer part of the bar-type anchoring element, and
- said proximity sensor is positioned so that when the rotary head couples with the extension element in a predetermined locking position, said collar element is positioned at the proximity sensor and activates the proximity sensor.

11. The drilling machine according to claim 4, wherein said position sensor is equipped with a power supply battery.

12. The drilling machine according to claim 4, wherein said position sensor is configured to transmit signals wirelessly.

13. The drilling machine according to claim 1, wherein
- the upper end of said extension element is coupled with a feeding tube,
- a bar anchoring element is coupled with a non-rotating part of said rotary head,
- said bar anchoring element extends substantially parallel to said extension element,
- said feeding tube is slidably coupled with said bar anchoring element through a collar element, and
- said detection system comprises a distance measurer configured to measure a distance between the rotary head or the bar anchoring element and the collar element or the feeding tube.

14. The drilling machine according to claim 1, wherein
- said extension element extends above said guide tower,
- lattice elements are arranged above the guide tower,
- said extension element is guided on said lattice elements through a guide trolley slidably coupled with the lattice elements, and
- said detection system comprises a distance measurer configured to measure a distance between the rotary head and the guide trolley.

15. The drilling machine according to claim 1, wherein said electronic processing and control unit is configured to enable a maneuver when said at least one locking position is detected.

16. A detection method, comprising:
- detecting the at least one locking position of the rotary head on the extension element of the string of drilling rods of the drilling machine according to claim 1 through said detection system.

* * * * *